(12) United States Patent
Marupaduga et al.

(10) Patent No.: US 10,171,150 B1
(45) Date of Patent: Jan. 1, 2019

(54) DYNAMIC OPTIMIZATION OF BEAMFORMING WEIGHTS

(71) Applicant: Sprint Communications Company L.P., Overland Park, KS (US)

(72) Inventors: Sreekar Marupaduga, Overland Park, KS (US); Andrew M. Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/632,813

(22) Filed: Jun. 26, 2017

(51) Int. Cl.
| | | |
|---|---|---|
| *H04B 1/00* | (2006.01) | |
| *H04B 15/00* | (2006.01) | |
| *H04B 7/06* | (2006.01) | |
| *H04B 7/0426* | (2017.01) | |
| *H04B 7/0452* | (2017.01) | |

(52) U.S. Cl.
CPC .......... *H04B 7/0617* (2013.01); *H04B 7/043* (2013.01); *H04B 7/0452* (2013.01); *H04B 7/0626* (2013.01); *H04B 7/0632* (2013.01)

(58) Field of Classification Search
CPC .... H04B 7/0617; H04B 7/0452; H04B 7/043; H04B 7/0626; H04B 7/0632
USPC ......................................................... 455/63.1
See application file for complete search history.

(56) References Cited

U.S. PATENT DOCUMENTS

2013/0157652 A1* 6/2013 Khaitan ................ H04W 52/16
455/422.1
2017/0366242 A1* 12/2017 Lee ...................... H04B 7/0482

* cited by examiner

*Primary Examiner* — Eugene Yun

(57) ABSTRACT

Dynamic beamforming in a telecommunications network in response to communication parameters is described. The communication parameters may be associated with at least one user device and/or at least one antenna. For example, the communication parameters may include CQI (channel quality indicator), SINR (signal-to-noise ratio), location data, channel load, sector load, band load, front-to-back ratio (F/B ratio), and/or upper side lobe suppression (USLS). The communication parameters may trigger generation of new beamforming weights and application of the new beamforming weights to the telecommunications network.

20 Claims, 10 Drawing Sheets ns herein;

DYNAMIC OPTIMIZATION OF BEAMFORMING WEIGHTS

BRIEF SUMMARY

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Generally beamforming uses multiple antennas to control the direction of a wavefront by appropriately weighting the amplitude and phase of individual antenna signals. Beamforming is made possible by weighting the amplitude and or phase of the signal broadcast at the individual antenna. Beamforming may further be made possible by weighting the tilt of the broadcasting antenna. The present disclosure is directed, in part, to dynamically setting beamforming weights for antennas serving a communications network, substantially as shown in and/or described in connection with at least one of the figures, and is set forth more completely in the claims.

In certain respects, beamforming is utilized by a base station to communicate with user equipment (UE) in a cell of one or more wireless networks. In a beamforming enabled network, phase, power, and amplitude values (BF values) are applied to the various lobes of a telecommunications antenna and/or antenna array such that the optimal broadcast beam is created. However, historically, these weights have been applied based on an initial coverage analysis of the area served by the telecommunications antenna and there was no possibility to dynamically vary the BF values based on different radio frequency (RF) or network connection conditions. While this historic approach was sufficient to produce a wireless telecommunications network capable of providing service to the relatively small number of UEs, the historic approach no longer satisfies the needs of a wireless telecommunications network moving forward. Further, the components, modules, processors, programs, and computers used to facilitate this historic approach to telecommunications networks could not function in the various embodiments described herein. As such, some aspects of the present disclosure describe and are directed to methods, systems, and devices that facilitate dynamic beamforming of telecommunications networks by incorporating previously unknown functions and configurations.

Aspects of the present disclosure are directed to dynamic optimization of a telecommunications network based on actual UE needs and demands. Aspects of the present disclosure are further directed to dynamically altering the coverage footprint of at least one telecommunications antenna through beamforming by altering the phase, amplitude, power, and/or tilt of an antenna in response to UE information. Some aspects of the present disclosure are directed to determining beamforming weight values based on radio frequency (RF) markers such as sector and/or channel loading, CQI, SINR, band capacity, front-to-back ratio (F/B ratio), upper side lobe suppression (USLS), and other UE experience markers. Further, some aspects of the present disclosure are directed toward dynamically detecting and analyzing the RF markers from one or more UE, and based on said analysis, generating and applying beamforming weights to at least one telecommunications antenna, such that at least one UE experience is, at least partially, optimized.

BRIEF DESCRIPTION OF THE DRAWINGS

Illustrative embodiments of the present invention are described in detail below with reference to the attached drawing figures, and wherein.

DETAILED DESCRIPTION

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Figure 1:
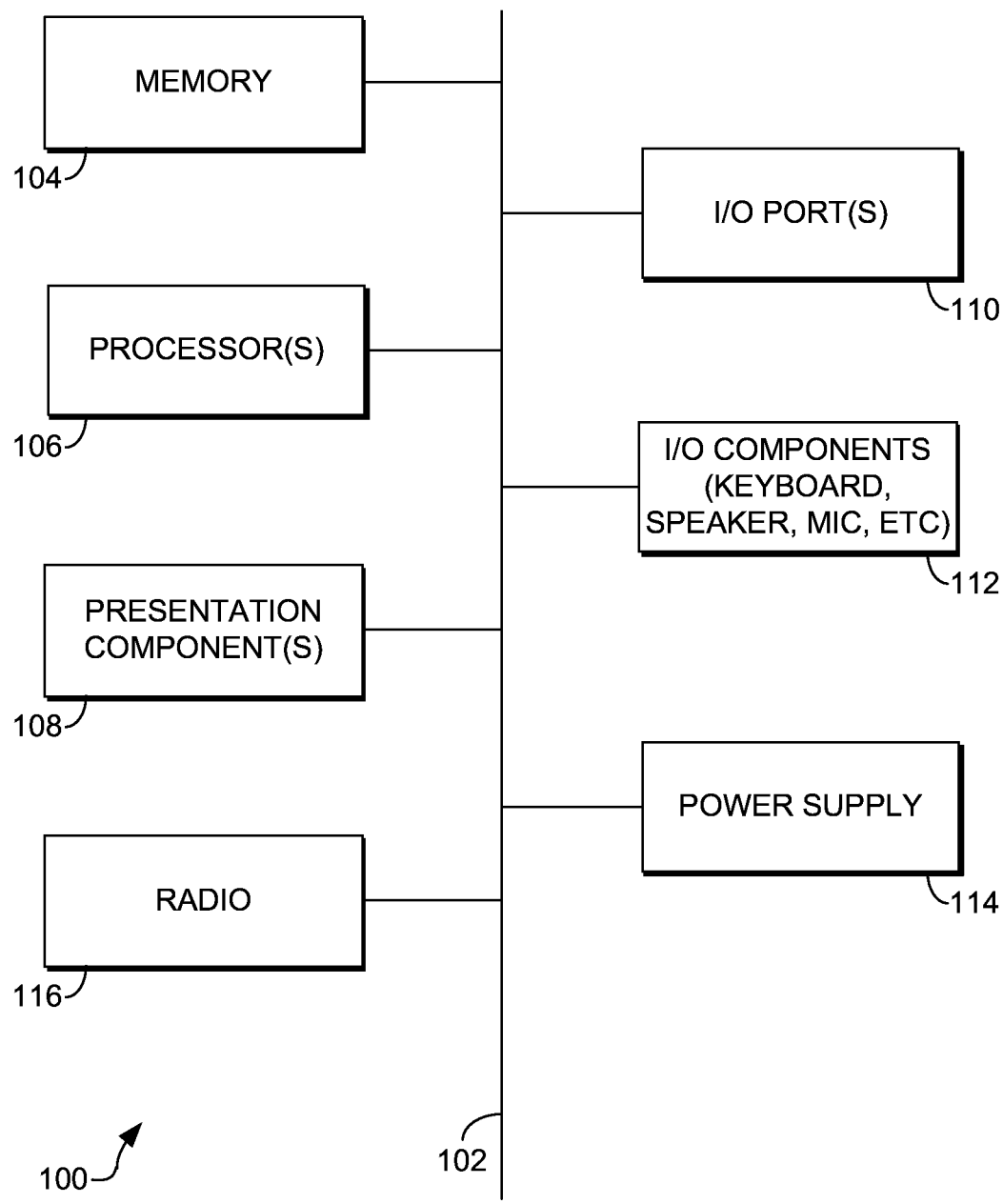
FIG. 1 depicts a block diagram of an exemplary computing environment suitable for use in implementing embodiments herein.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
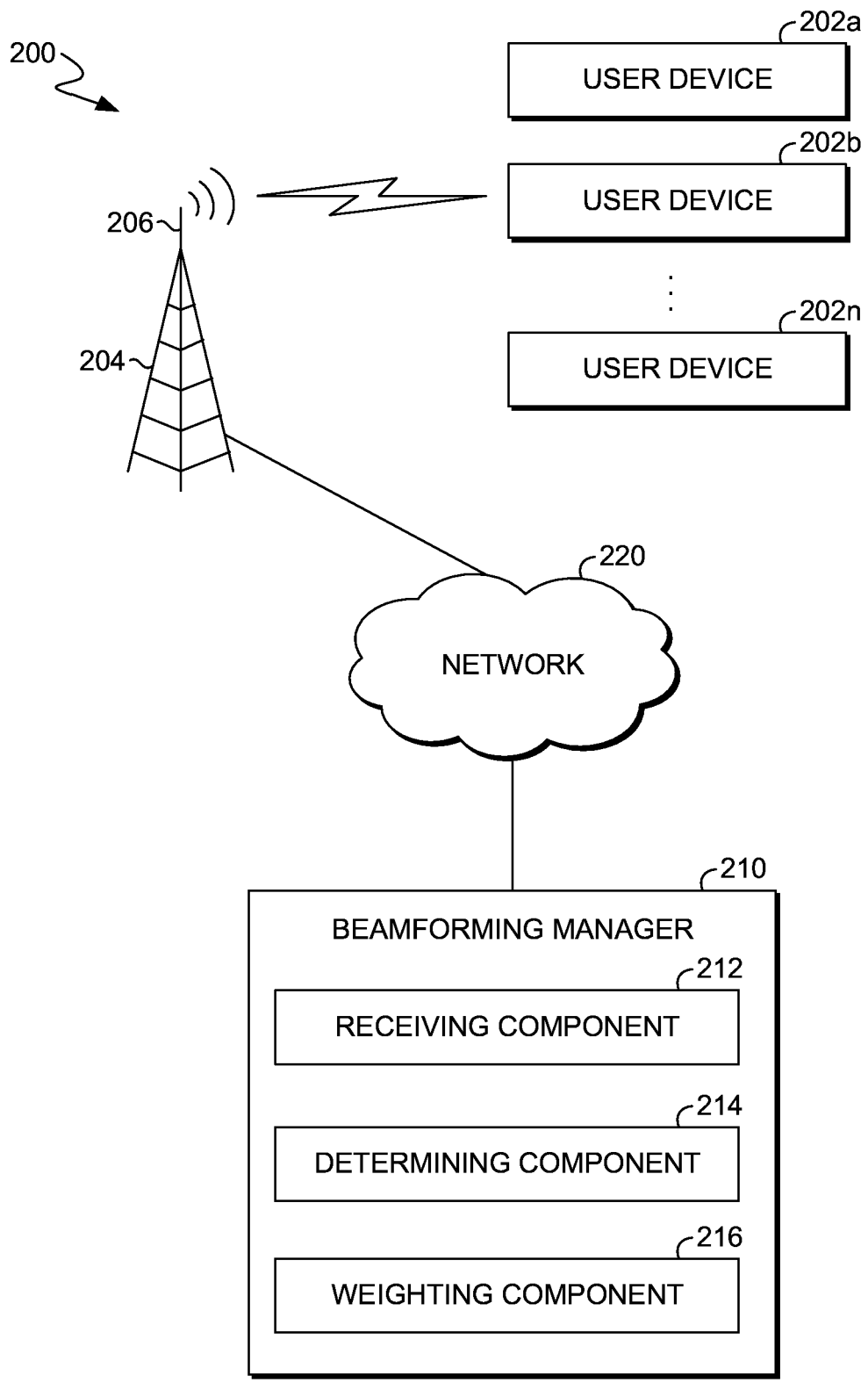
FIG. 2 depicts a wireless communications network, according to an aspect herein.

Referring to FIG. 2, a network environment suitable for use in implementing embodiments of the present disclosure is provided. Such a network environment as illustrated in FIG. 2 is designated generally as network environment 200. Network environment 200 is but one example of a suitable network environment and is not intended to suggest any limitation as to the scope of use or functionality of the disclosure. Neither should network environment 200 be interpreted as having any dependency or requirement relating to any one or combination of components illustrated.

As previously mentioned, embodiments of the present invention are directed to dynamically adjusting beamforming weights within a network cell. In embodiments, a network cell may comprise a base station to facilitate wireless communication between communication devices within the network cell and a network. As shown in FIG. 2, a communication device may be a user device 202a, 202b, and 202n. In the network environment 200, user device 202a (as well as user devices 202b and 202n) may communicate with other devices, such as mobile devices, servers, etc. The user device 202a may take on a variety of forms, such as personal computer, a laptop computer, a tablet, a netbook, a mobile phone, a smart phone, a personal digital assistant, or any other device capable of communicating with other devices by way of a network. In one embodiment, user device 202a is the type of device described herein with respect to FIG. 1. Makers of illustrated devices include, for example, Research in Motion, Creative Technologies Corp., Samsung, Apple computers, Nokia, Motorola, and the like. A device can include, for example, a display(s), a power source(s) (e.g., a battery), a data store(s), a speaker(s), memory, a buffer(s), and the like. In embodiments, user device 202a comprises a wireless or mobile device with which a wireless telecommunication network(s) can be utilized for communication (e.g., voice and/or data communication). In this regard, the user device 202a can be any mobile computing device that communicates by way of, for example, a 3G or 4G network. In embodiments, network environment 200 may further comprise a plurality of user devices substantially similar to user device 202a.

The user device 202a may utilize network 220 to communicate with other computing devices, such as user devices 202b and 202n (e.g., mobile device(s), a server(s), a personal computer(s), etc.). In embodiments, network 220 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 220 may include multiple networks, as well as being a network of networks, but is shown in more simple form so as to not obscure other aspects of the present disclosure. Network 220 may be part of a telecommunications network that connects subscribers to their immediate service provider. In embodiments, network 220 is associated with a telecommunications provider that provides services to user devices, such as user device 202a. For example, network 220 may provide voice services to user devices or corresponding users that are registered or subscribed to utilize the services provided by a telecommunications provider. Network 220 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), a 5G network, or the like.

The network environment 200 may also include a database (not shown). The database can be any type of medium that is capable of storing information. The database can be any collection of records. In one embodiment, the database includes a set of embodied computer-executable instructions that, when executed, facilitate various aspects disclosed herein. These embodied instructions will variously be referred to as "instructions" or an "application" for short.

As previously mentioned, the user device 202a may communicate with other devices by using a base station, such as base station 204. In embodiments, base station 204 is a wireless communications station that is installed at a fixed location, such as a telecommunication tower, as illustrated in FIG. 2. The telecommunication tower may be a tall structure designed to support one or more antennas 206 for telecommunications and/or broadcasting. In other embodiments, base station 204 is a mobile base station (e.g., small cell). The base station 204 may be an eNode B in an LTE telecommunications network and is used to communicate as part of the wireless communications network. In this way, base station 204 can facilitate wireless communications between user device 202a and 202b through 202n, and network 220.

The base station 204 may include at least one baseband unit (BBU) responsible for, among other things, digital baseband signal processing. For instance, CDMA/EVDO and LTE Internet protocol (IP) packets are received from a wireless communications network and are digitally combined by the BBU at the base station 204. The blended digital baseband signal is then transmitted to a radio at the base station 204. Digital baseband signals received from the radio are demodulated by the BBU and the resulting IP packets are then transmitted by the BBU to the network. The base station 204 may also include or be associated with an LTE System Manager (LSM) configured to manage a master list (e.g., a table) of beamforming weights. The list of beamforming weights may include a plurality of beamforming weights applicable to a plurality of antennas, antenna model numbers, down tilt angles of antennas, and the like. The listing may also include beamforming weights applicable to beamforming configurations, such as full-power broadcast beamforming and non-full power broadcast beamforming, including tapered beamforming.

As stated, the base station 204 may include a radio (not shown) or a remote radio head (RRH) that generally communicates with one or more antennas 206 associated with the base station 204. In some embodiments, the one or more antennas may comprise at least one antenna and/or antenna array. In this regard, the radio is used to transmit signals or data to an antenna 206 associated with the base station 204 and receive signals or data from the antenna 206. Communications between the radio and the antenna 206 can occur using any number of physical paths. A physical path, as used herein, refers to a path used for transmitting signals or data. As such, a physical path may be referred to as a radio frequency (RF) path, a coaxial cable path, cable path, or the like.

The antenna 206 is used for telecommunications. Generally, the antenna 206 may be an electrical device that converts electric power into radio waves and converts radio waves into electric power. The antenna 206 is typically positioned at or near the top of the telecommunication tower as illustrated in FIG. 2. Such an installation location, however, is not intended to limit the scope of embodiments of the present invention. In some embodiments antenna 206, may be a single antenna, at least one antenna, and/or a plurality of antenna. In some embodiments, antenna 206 may be a signal antenna array, at least one antenna array, and/or a plurality of antenna arrays. The radio associated with the base station 204 may include at least one transceiver configured to receive and transmit signals or data. For example, the radio may transmit and receive wireless RF signals and convert the blended digital signal received from the BBU into an analog RF output via a digital-to-analog (AD) converter. The analog signal may then be amplified by an amplifier in the radio and sent out for transmission to a remote communications device, such as user device 202. The RF signals received from the remote communications device, such as user device 202, are amplified by the radio and converted to digital baseband signals for transmission to the BBU.

The antenna 206 of FIG. 2 may be configured to support multiple-input-multiple-output (MIMO) and beamforming transmission modes. In embodiments, antenna 206 may rely on a MIMO transmission mode when user device 202a is located near the radio tower and may rely on a beamforming transmission mode when the user device 202a is located on the periphery of a coverage area.

Continuing, the network environment 200 may further include a beamforming manager 210. The beamforming manager 210 may be configured to, among other things, control the weights of the beams in accordance with the present disclosure. The beamforming manager 210 may comprise a server having one or more processors. Though beamforming manager 210 is illustrated separately in FIG. 2, it may be a component of base station 204. In other embodiments, the beamforming manager 210 may be remotely located.

As mentioned, the beamforming manager 210 may control weights for the beams at one or more antennas associated with one or more base stations, such as base station 204. The beamforming manager 210 may include, among other things, a receiving component 212, a determining component 214, and weighting component 216. The receiving component 212 may receive, among other things, data from user devices, such as user device 202, within a network cell associated with a particular base station 204. The data received by the receiving component 212 may be a part of historical data received from the user device 202, the historical data indicating various information about the user device 202 and network performance. The historical data may be collected and stored over a period of time. The receiving component 212 may receive this data continuously and/or periodically, such as, for instance, every two to six hours, twice a day, once a day, or once a week. Longer time periods, such as two weeks to three months, and other periods of time are also contemplated in accordance with aspects disclosed herein. The data received during these periods may be used to provide information relating to a user device 202 at a specific point in time or may be used to acquire historical patterns, such as patterns of user device locations and/or densities within a network cell over time. Further, in some embodiments, the receiving component 212 may receive data from base station 204 and/or antenna 206.

This data received by the receiving component 212 may include at least one of CQI (channel quality indicator), SINR (signal-to-noise ratio), location data indicating a location of each of the user devices 202a and 202b through 202n within the cell, channel load, sector load, band load, front-to-back ratio (F/B ratio), and/or upper side lobe suppression (USLS). CQI data may indicate a subjective and/or objective measure of the call quality for each of the user devices (202a and 202b through 202n) within the cell. SINR data may indicate the measured signal-to-noise ratio for each of the user devices (202a and 202b through 202n) within the cell. Location data may indicate specific coordinates of the user devices (202a and 202b through 202n) and/or may indicate a distance between the user device (202a and 202b through 202n) and the base station 204 and/or a direction. Channel load data may indicate the rate at which user devices (202a and 202b through 202n) are added and/or removed from communicating with the cell, and/or the bandwidth used by at least one user device with a channel. Further, Channel load data may indicate a number of channels within a given band used by a user device, more than one user device, or a plurality of user devices. Sector load data may indicate the rate at which user devices (202a and 202b through 202n) are added and/or removed from communicating with a sector within the cell, and/or the bandwidth used by at least one user device within a sector. F/B ratio may indicate the ratio of signal broadcast in the desired (target) direction compared to the signal broadcast in the opposite direction. USLS may indicate the amount of suppression of signal broadcast in the unwanted (non-target) direction. Band load may indicate the rate at which user devices (202a and 202b through 202n) are added and/or removed from communicating with a band within the cell, and/or the bandwidth used by at least one user device with a band.

Generally, receiving component 212 receives information from base station 204. In some embodiments, receiving component 212 receives the information from the base station 204 through the network 220. In embodiments, the information received by receiving component 212 may comprise communication parameters relating to the communication between base station 204 and at least one user device, such as user device 202. For example, in some embodiments communication parameters may comprise at least one of CQI, SINR, a user device location, channel load, sector load, band load, access failures, and the like. Further, in some embodiments receiving component 212 may receive communication parameters associated with broadcasting antenna, such as antenna 206. For example, in embodiments the receiving component 212 may receive the F/B ratio, USLS. In some embodiments, the receiving component 212 may receive network configuration information such as current broadcast mode (e.g. full power mode, beamform mode) and the phase, amplitude, power, and tilt weights values associated with the one or more antennas, antenna arrays, telecommunication towers, and/or base stations.

Generally, determining component 214 monitors and analyzes the communication parameters received by receiving component 212. Further, determining component 214 determines whether to dynamically modify the beamforming weights of an antenna, such as antenna 206. In some embodiments, determining component 214 may monitor and analyze communication parameters associated with user devices individually, such as CQI, SINR, channel load, communication initiation, communication termination, access failures, and user device location. In some embodiments, determining component 214 may monitor and analyze communication parameters associated with a plurality of user devices, such as sector load and channel load. In some embodiments, determining component 214 may derive, monitor, and analyze communication components related to user devices based on a plurality of monitored user devices, such as band load and interband balance. As used herein, interband balance refers to a comparison between the current load and the maximum capacity for a first band and the current load and maximum capacity of at least one other band.

In some embodiments, determining component 214 may analyze communication parameters by comparing the monitored data with one or more experience thresholds. Experience thresholds may be associated with an individual communication parameter. For example CQI may have a first experience threshold, SINR may have a second experience threshold, channel load may have a third experience threshold, and sector load may have a fourth experience threshold, and so on. In some embodiments, the individual experience thresholds may be a predetermined value for each communication parameter. In some embodiments, the experience threshold may be associated with multiple communication parameters. For example, and experience threshold may be a CQI of a first value with a SINR of a second value. For another example, and experience threshold may be a SINR of a first value, a channel load of a second value, and an interband balance of a third value. It will be understood by those skilled in the art that the use experience thresholds are merely examples of possible multi-variant thresholds determining component 214 may use to analyze the communication parameter(s).

Further, in some embodiments, determining component 214 may comprise a historical database of communication parameters (not shown) and/or may be communicatively coupled to a database (not shown) storing, at least temporarily, communication parameters. In some embodiments, the database may receive communication parameters associated with a user device, two or more user devices, and/or a plurality of user devices. The communication parameters may also be associated with a plurality, two or more, and/or one antenna, antenna array, telecommunication tower, and/or base station. For example, the database may comprise a list of SINR, CQI, failure rates, channel load, band load, communication initiation, and/or communication termination for user devices, information indicating the location of the user devices at the time the associated communication parameter(s) were received. The database may also comprise the band, channel, beamforming weights, broadcast mode, transmission mode, and/or antenna properties (such as F/B and USLS) at the time the communication parameters were received.

In some embodiments, determining component 214 may compare one or more of the monitored communication parameters with the one or more associated experience thresholds to determine whether the experience thresholds are violated. Determining a violation of the experience threshold may vary based on the type of the communication parameters being evaluated. For example, a CQI and/or SINR less than or equal to the associated experience threshold may be a violation; while a channel load, sector load, and/or band load greater than or equal to the associated experience threshold may be a violation. In such an embodiment, one or more violations of the evaluated experience threshold(s) by the communication parameter(s) may trigger the determining component 214 to activate weighting component 216. In some embodiments, the experience threshold(s) may be based, in part, on the historical database of communication parameters.

Generally, weighting component 216 generates beamforming weights and applies the beamforming weights to an antenna, such as antenna 206. In some embodiments, weighting component 216 generates the beamforming weights upon activation by determining component 214. Further, in some embodiments weighting component 216 may detect the current transmission mode and/or beamforming weights currently used by an antenna, such as antenna 206. In some embodiments, generation of the beamforming weights by weighting component 216 may comprise selection of a set of beamforming weights from a predetermined list of potential beamforming weights. In an embodiment, the list of potential beamforming weights may be based on beamforming weights applied to a similar antenna and/or antenna array in a testing environment. In an embodiment, the predetermined list of potential beamforming weights may be associated with optimal conditions for implementation, comprising at least one of: location of user devices, number of user devices, antenna/antenna array compatibility information, band compatibility information, and band balancing rules. Additionally, and/or alternatively, in some embodiments generation of the beamforming weights may comprise utilizing machine learning models for optimized beamforming based on theoretical and/or historical antenna and/or antenna array performance data. In some embodiments, the historical antenna and/or antenna array performance may be determined by communication parameters analyzed by the beamforming manager and the associated beamforming weights used by the antenna, antenna array, telecommunication tower, and/or base station.

In some embodiments, the beamforming manager may further comprise a network monitor (not depicted) generally configured to monitor current network conditions. In an embodiment, the network monitor is communicatively coupled with determining component 214. Additionally, in some embodiments network monitor may receive information from other telecommunications antenna within network x. In such an embodiment, network monitor may also receive UE data associated with the other telecommunications antenna as discussed below.

Figure 3A:
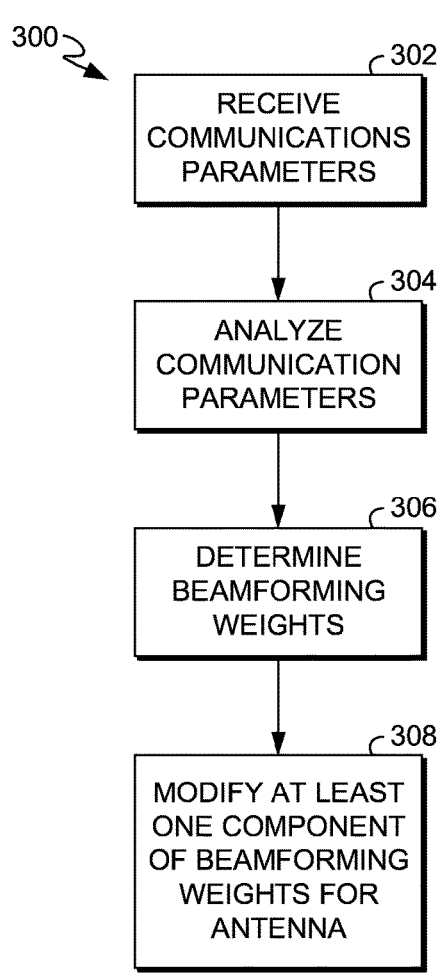
FIG. 3A depicts a flow diagram of a method for dynamic beamforming, according to an aspect herein.

Turning to FIG. 3A, a flow chart illustrating method 300 for dynamically adjusting beamforming weights within a network cell in accordance with aspects disclosed herein is provided. In some embodiments, method 300 can be used for dynamic beamforming in response to sub-optimal communication between a base station and at least one user device. Sub-optimal communication may be detected and dynamic beamforming activated by a specialized system, such as beamforming manger 210 described in relation to FIG. 2, which monitors communication parameters.

At block 302, communication data is received from at least one user device. In some embodiments of block 302, the communications data may be received by beamforming manager 210 through a telecommunication network, such as telecommunications network 220 of FIG. 2. Further, in some embodiments, the communications data may comprise communication parameters. The communication parameters may be one or more of a CQI, SINR, channel load, sector load, band load, and/or device location. One or more communication parameters may be continuously received and/or received at periodic intervals.

At block 304, communication parameters are analyzed. In general, communication data, such as communication parameters, is analyzed to determine whether the communication data indicates sub-optimal communication between the network and at least one user device. Some embodiments of block 304 further comprise, determining that the communication parameters violate an experience threshold. In some embodiments, sub-optimal communication between the network and one user device may be detected where the communication parameters received in block 302 violate at least one experience threshold. Block 304 may comprise analyzing at least one communication parameter by comparing the monitored data with one or more experience thresholds. Experience thresholds may be associated with an individual communication parameter. For example, CQI may have a first experience threshold, SINR may have a second experience threshold, channel load may have a third experience threshold, and sector load may have a fourth experience threshold, and so on. In some embodiments, the individual experience thresholds may be a predetermined value for each communication parameter. In some embodiments, the experience threshold may be associated with multiple communication parameters. For example, an experience threshold may be a CQI of a first value with a SINR of a second value. For another example, an experience threshold may be a SINR of a first value, a channel load of a second value, and an interband balance of a third value. It will be understood by those skilled in the art that the use of experience thresholds are merely examples of possible multi-variant thresholds some embodiments of block 304 may use to analyze the communication parameter(s). Some embodiments of block 304 may further comprise detecting current antenna settings. The information may comprise current broadcast mode (e.g. full power mode, beamform mode, tapered beamforming) and the phase, amplitude, power weights, and tilt associated with the one or more antenna.

At block 306, beamforming weights are generated based on UE data and current antenna, antenna array, telecommunication tower, and/or base station settings. In an embodiment, block 306 may be facilitated by a beamforming manager, such as beamforming manager 210, or subcomponents thereof. In some embodiments, generating the beamforming weights may further comprise comparing the current antenna settings to a predetermined list of beamforming weights with known and or predicted effects for the broadcasted signal. Additionally and/or alternatively, generating the beamforming weights may further comprise comparing the current antenna settings to beamforming weights determined by machine learned models. In some embodiments, the generated beamforming weights comprise at least one different value from the current antenna settings. For example, the generated beamforming weights may comprise a different power, amplitude, phase, and/or tilt while maintaining the current values for the three unmodified settings. In some embodiments, the generated beamforming weights may comprise one or more different values from the current antenna settings. For example, in some embodiments any combination of power, amplitude, phase, and/or tilt may be modified.

At block 308, the generated beamforming weights are applied to the antenna. Generally, at block 308, generated beamforming weights are applied to the telecommunications antenna such that the area covered by the sector, channel, and/or band are altered. In some embodiments, applying the generated beamforming weights to the antenna may increase the SINR, CQI, available bandwidth, and/or general signal strength and quality to at least one user device, such as user device 202a. In further embodiments, applying the generated beamforming weights to the antenna may alter the sector, band, channel, antenna, antenna array, and/or telecommunication tower used to communicate with the one or more user devices.

Figure 3B:
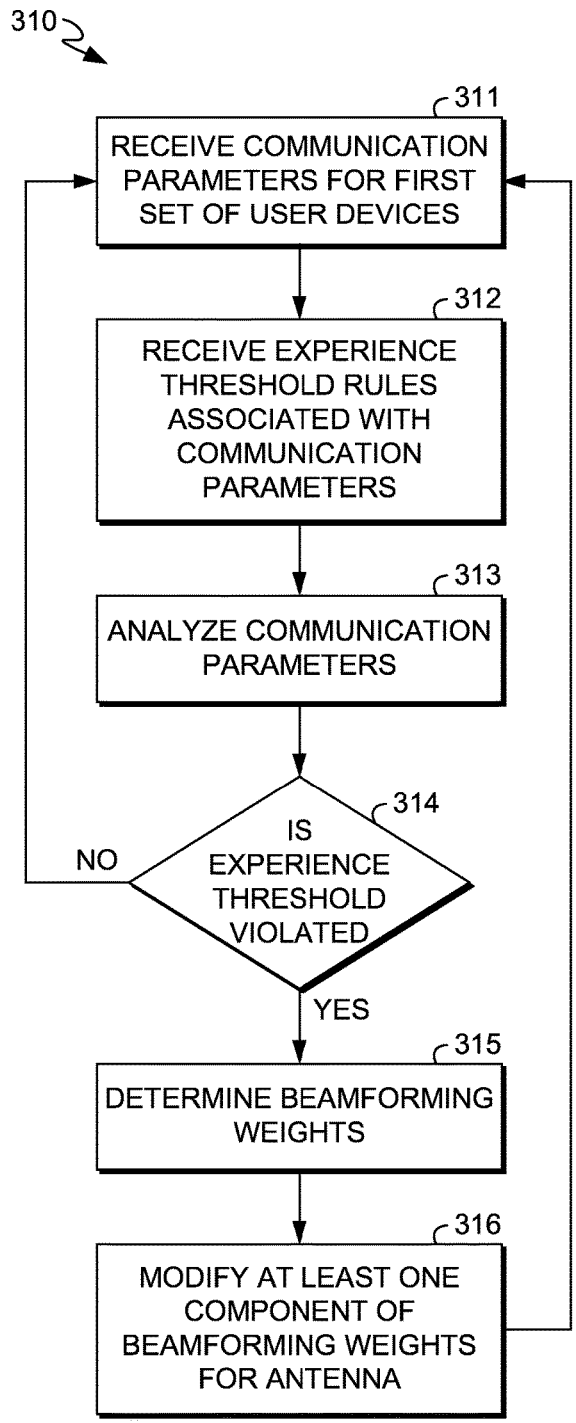
FIG. 3B depicts a flow diagram of a method for continuous dynamic beamforming, according to an aspect herein.

Turning to FIG. 3B, a method 310 is provided for continuous dynamic modification of beamforming weights within a network cell in accordance with embodiments described herein. Some embodiments of method 310 may be facilitated by a beamforming manager, such as beamforming manager 210 described herein in reference to FIG. 2. At block 311, communication parameters are received for a first set of user devices. In some embodiments, the communication parameters may be received by beamforming manager 210 through telecommunications networks, such as network 220.

At block 312, at least one experience threshold associated with communication parameters is received. In some embodiments, the experience threshold(s) may be associated with a set of rules associated with the communication parameter(s). Some embodiments of block 312 may be facilitated by beamforming manager 210 discussed in relation to FIG. 2. Experience thresholds may be associated with an individual communication parameter. For example, CQI may have a first experience threshold, SINR may have a second experience threshold, channel load may have a third experience threshold, and sector load may have a fourth experience threshold, and so on. The individual experience thresholds may be a predetermined value for each communication parameter, and may be associated with multiple communication parameters. For example, an experience threshold may be a CQI of a first value with a SINR of a second value. For another example, and experience threshold may be a SINR of a first value, a channel load of a second value, and an interband balance of a third value. It will be understood by those skilled in the art that the use of experience thresholds are merely examples of possible multi-variant experience thresholds contemplated within the scope of aspects herein. In some embodiments, at least one experience threshold rule may be received from a communicatively coupled database (not depicted), storage media (not depicted), and/or server (not depicted). The communicatively coupled database, storage media, and/or server may be remotely connected to network 220 or directly connected to beamforming manager 210. Although method 310 depicts block 312 as an independent block, it will be understood by those in the art that, in various embodiments, block 312 may be incorporated with block 311, block 313, block 314, or may be incorporated with blocks not depicted in method 310.

At block 313, communication parameters are analyzed. Some embodiments of block 313 may be facilitated by a beamforming manager, and/or a beamforming manager's sub-components, such as beamforming manager 210 and/or determining component 214 described herein in relation to FIG. 2. In general, communication data, such as communication parameters, is analyzed to determine whether the communication data indicates sub-optimal communication between the network and at least one user device. At block 314, it is determined whether the experience threshold is violated. Some embodiments of block 314 may be facilitated by a beamforming manager, and/or a beamforming manager's sub-components, such as beamforming manager 210 and/or determining component 214 described herein in relation to FIG. 2. In some embodiments, sub-optimal communication between the network and at least one user device may be detected where the communication parameters received in block 311 violate at least one experience threshold received in block 312. If no experience threshold(s) is violated, an embodiment of method 310 returns to block 311. If at least one experience threshold is violated, method 310 continues to block 315.

At block 315, beamforming weights are determined. Some embodiments of block 315 maybe facilitated by a beamforming manager, and/or a beamforming manager's sub-components, such as beamforming manager 210 and/or weighting component 216 described herein in relation to FIG. 2. In an embodiment, upon determining that at least one experience threshold is violated, a determining component, such as determining component 214, may activate a weighting component such as weighting component 216. In an embodiment, beamforming weights may be based on UE data and current antenna, antenna array, telecommunication tower, and/or base station settings. In some embodiments, generating the beamforming weights may further comprise comparing the current antenna settings to a predetermined list of beamforming weights with known and or predicted effects for the broadcasted signal. Additionally and/or alternatively, generating the beamforming weights may further comprise comparing the current antenna settings to beamforming weights determined by machine learned models. In some embodiments, the generated beamforming weights comprise at least one different value from the current antenna settings. For example, the generated beamforming weights may comprise a different power, amplitude, phase, and/or tilt while maintaining the current values for the three unmodified settings. In some embodiments, the generated beamforming weights may comprise one or more different values from the current antenna settings. For example, in some embodiments, any combination of power, amplitude, phase, and/or tilt may be modified.

At block 316, at least one component of beamforming weights for the antenna is modified. Some embodiments of block 316 may be facilitated by a beamforming manager, such as beamforming manager 210. Generally, at block 316 generated beamforming weights are applied to antenna, antenna array, telecommunication tower, and/or base station such that the area covered by the sector, channel, and/or band are altered. In some embodiments, applying the generated beamforming weights to the antenna may increase the SINR, CQI, available bandwidth, and/or general signal strength and quality to at least one user device, such as user device 202a. In further embodiments, applying the generated beamforming weights to the antenna may alter the sector, band, channel, antenna, antenna array, and/or telecommunication tower used to communicate with the one or more user devices. Once the generated beamforming weights are applied, method 310 may return to block 311. As such, method 310 may facilitate the continuous dynamic beamforming for at least one user device and/or set of user devices.

Figure 3C:
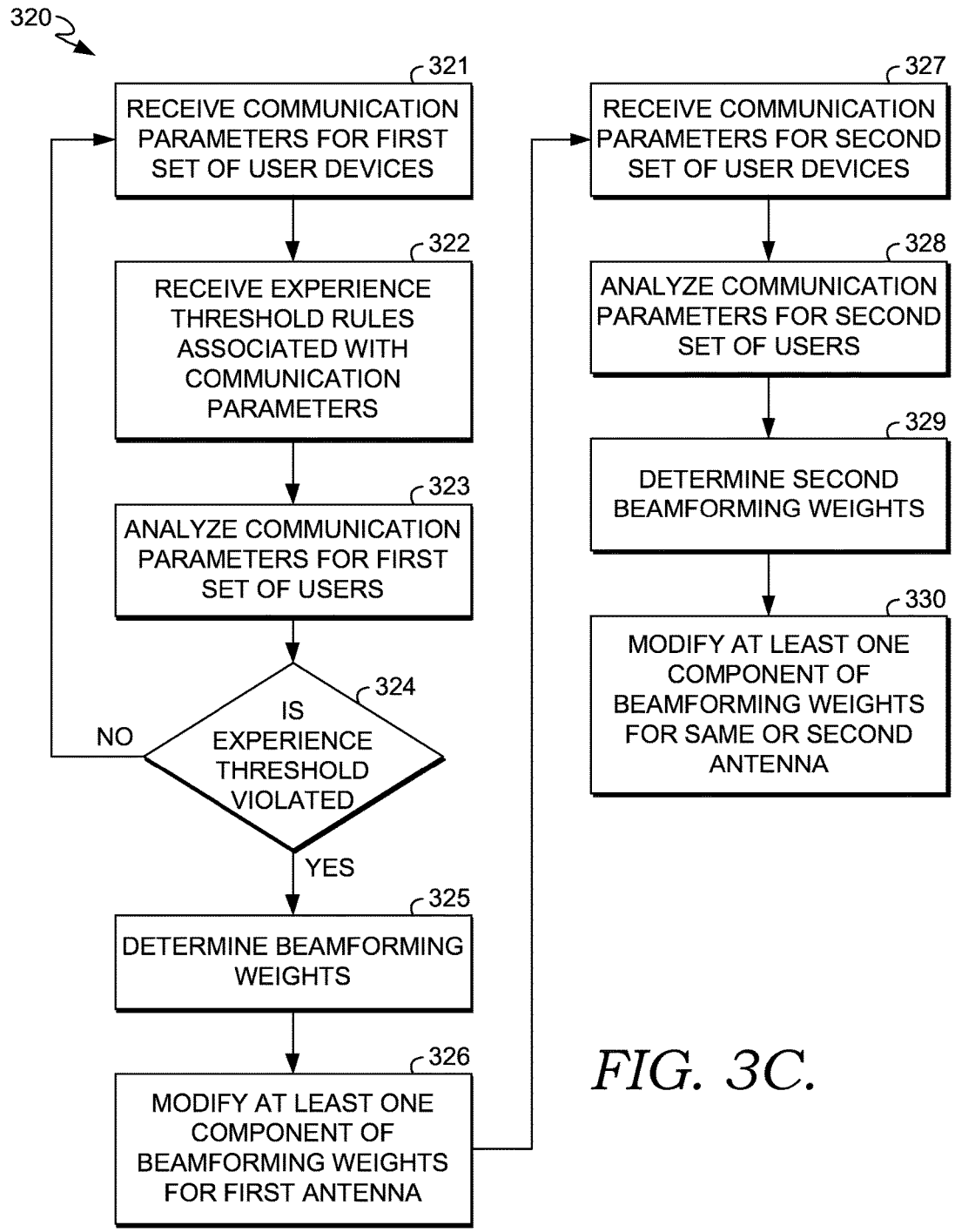
FIG. 3C depicts flow diagram of a method for multi-user set, band, sector, and/or channel dynamic beamforming, according to an aspect herein.

Turning to FIG. 3C, a method 320 is provided for multi-user group dynamic adjustment of beamforming weights within a telecommunication network in accordance with embodiments described herein. Some embodiments of method 320 may be facilitated by a beamforming manager, such as beamforming manager 210 described herein in relation to FIG. 2. At block 321, communication parameters for first set of user devices are received. In some embodiments, the first set of user devices comprise at least one user device. In some embodiments, the communication parameters may be received by beamforming manager 210 through telecommunications networks, such as telecommunications network 200.

At block 322, experience threshold rules associated with communication parameters are received. Some embodiments of block 322 may be facilitated by beamforming manager 210. In some embodiments of block 322, experience thresholds may be associated with an individual communication parameter. For example CQI may have a first experience threshold, SINR may have a second experience threshold, channel load may have a third experience threshold, and sector load may have a fourth experience threshold, and so on. In some embodiments, the individual experience thresholds may be a predetermined value for each communication parameter. In some embodiments, the experience threshold may be associated with multiple communication parameters. For example, and experience threshold may be a CQI of a first value with a SINR of a second value. For another example, and experience threshold may be a SINR of a first value, a channel load of a second value, and an interband balance of a third value. It will be understood by those skilled in the art that the use experience thresholds are merely examples of possible multi-variant experience thresholds contemplated within the scope of the present invention. In some embodiments, at least one experience threshold rule may be received from a communicatively coupled data base (not depicted), storage media (not depicted), and/or server (not depicted). In an embodiment, the communicatively coupled data base, storage media, and/or server may be remotely connected to network 220 or directly connected to beamforming manager 210. Although method 320 depicts block 322 as an independent block, it will be understood by those in the art that, in various embodiments, block 322 may be incorporated with block 321, block 323, block 324, or may incorporated with blocks not depicted in method 320.

At block 323, communication parameters are analyzed. Some embodiments of block 323 may be facilitated by a beamforming manager, and/or a beamforming manager's sub-components, such as beamforming manager 210 and/or determining component 214. In general, communication data, such as communication parameters, is analyzed to determine whether the communication data indicates sub-optimal communication between the network and at least one user device. At block 324, it is determined whether at least one experience threshold is violated. Some embodiments of block 324 maybe facilitated by a beamforming manager, and/or a beamforming manager's sub-components, such as beamforming manager 210 and/or determining component 214. In some embodiments, sub-optimal communication between the network and at least one user device may be detected where the communication parameters received in block 321 violates at least one experience threshold received in block 322. If no experience threshold(s) are violated method 320 returns to block 321. If at least one experience threshold is violated method 310 continues to block 325.

At block 325, beamforming weights are determined. Some embodiments of block 325 maybe facilitated by a beamforming manager, and/or a beamforming manager's sub-components, such as beamforming manager 210 and/or weighting component 216. In an embodiment, upon determining that at least one experience threshold is violated a determining component, such as determining component 214, may activate a weighting component such as weighting component 216. In an embodiment, beamforming weights may be based on UE data and current antenna, antenna array, telecommunication tower, and/or base station settings. In some embodiments, generating the beamforming weights may further comprise comparing the current antenna settings to a predetermined list of beamforming weights with known and or predicted effects for the broadcasted signal. Additionally and/or alternatively, generating the beamforming weights may further comprise comparing the current antenna settings to beamforming weights determined by machine learned models. In some embodiments, the generated beamforming weights comprise at least one different value from the current antenna settings. For example, the generated beamforming weights may comprise a different power, amplitude, phase, and/or tilt while maintaining the current values for the three unmodified settings. In some embodiments, the generated beamforming weights may comprise one or more different values from the current antenna settings. For example, in some embodiments any combination of power, amplitude, phase, and/or tilt may be modified.

At block 326, at least one component of beamforming weights for the antenna, antenna array, telecommunication tower, and/or base station are modified. Some embodiments of block 326 maybe facilitated by a beamforming manager, such as beamforming manager 210. Generally, at block 326 generated beamforming weights are applied to antenna, antenna array, telecommunication tower, and/or base station such that the area covered by the sector, channel, and/or band are altered. In some embodiments, applying the generated beamforming weights to the antenna may increase the SINR, CQI, available bandwidth, and/or general signal strength and quality to at least one user device, such as user device 202a. In further embodiments, applying the generated beamforming weights to the antenna may alter the sector, band, channel, antenna, antenna array, and/or telecommunication tower communication band used to communicate with the one or more user devices. Once the generated beamforming weights are applied, method 320 may continue to block 327.

At block 327, communication parameters for a second set of user devices are received. In some embodiments, the second set of user devices comprise at least one user device. In some embodiments, the communication parameters may be received by beamforming manager 210 through telecommunications networks, such as telecommunications network 200. At block 328, communication parameters associated with at least the second set of user devices are analyzed. Some embodiments of block 328 may be facilitated by a beamforming manager, and/or a beamforming manager's sub-components, such as beamforming manager 210 and/or determining component 214. In general, communication data, such as communication parameters associated with at least the second set of user devices, is analyzed to determine whether the communication data indicates sub-optimal communication between the network and at least one user device. Some embodiments of block 328 may compare the received communication parameters with at least one experience threshold to determine if the experience threshold is violated.

At block 329, a second set of beamforming weights is determined. Some embodiments of block 325 maybe facilitated by a beamforming manager, and/or a beamforming manager's sub-components, such as beamforming manager 210 and/or weighting component 216. In an embodiment, upon determining that at least one experience threshold is violated a determining component, such as determining component 214, may activate a weighting component such as weighting component 216. In an embodiment, beamforming weights may be based on UE data and current antenna, antenna array, telecommunication tower, and/or base station settings. In some embodiments, generating the beamforming weights may further comprise comparing the current antenna settings to a predetermined list of beamforming weights with known and or predicted effects for the broadcasted signal. Additionally and/or alternatively, generating the beamforming weights may further comprise comparing the current antenna settings to beamforming weights determined by machine learned models. In some embodiments, the generated beamforming weights comprise at least one different value from the current antenna settings. For example, the generated beamforming weights may comprise a different power, amplitude, phase, and/or tilt while maintaining the current values for the three unmodified settings. In some embodiments, the generated beamforming weights may comprise one or more different values from the current antenna settings. For example, in some embodiments any combination of power, amplitude, phase, and/or tilt may be modified.

At block 330, at least one component of beamforming weights of the first antenna, antenna array, telecommunication tower, and/or base station modified in block 326 are modified. Some embodiments of block 330 may modify at least one component of beamforming weights of a second antenna, antenna array, telecommunication tower, and/or base station.

Figure 3D:
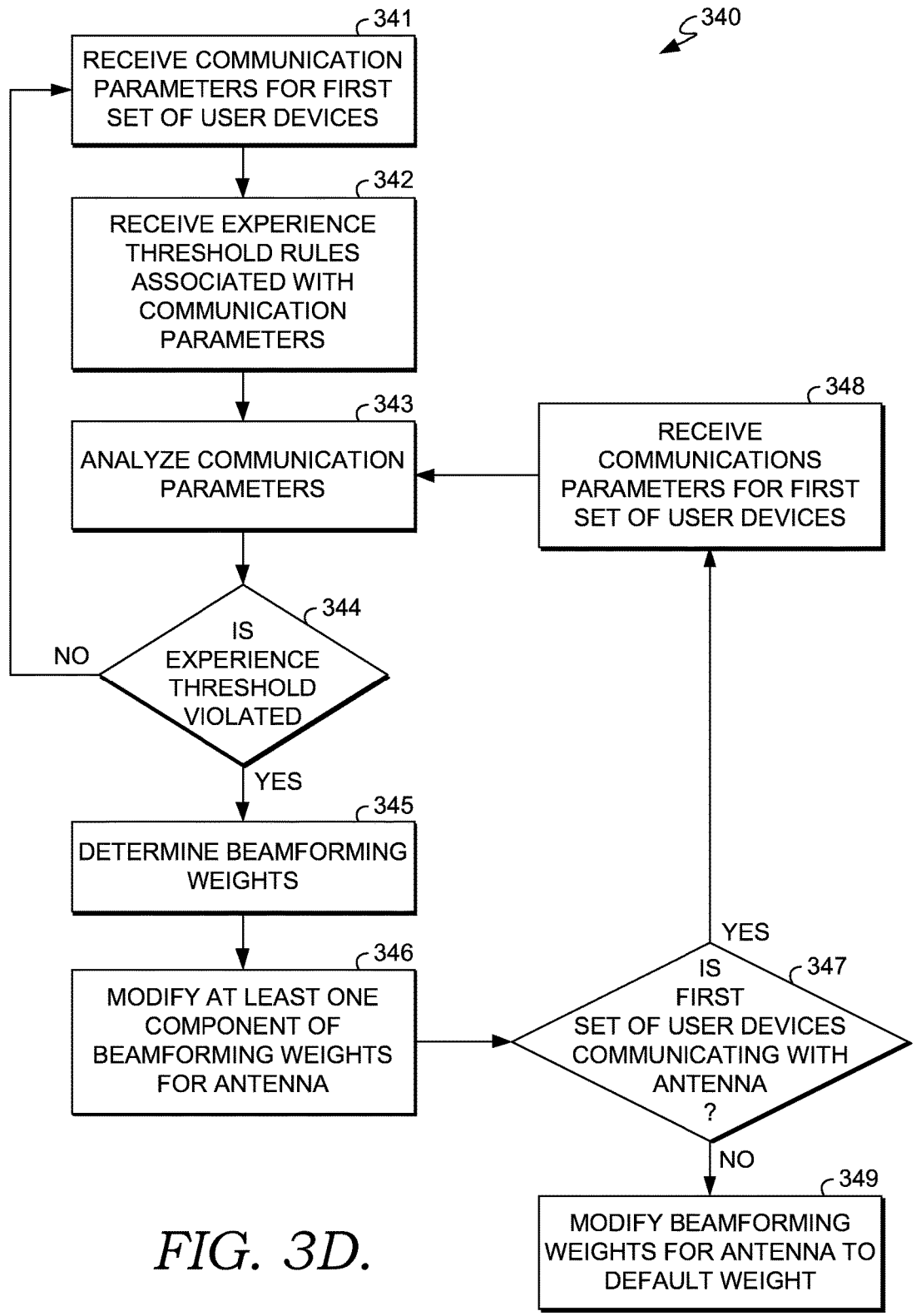
FIG. 3D depicts a flow diagram of a method for automatically resetting dynamic beamforming, according to an aspect herein.

Turning to FIG. 3D, a method 340 is provided for self-resetting dynamic adjustment of beamforming weights within a telecommunication network in accordance with embodiments described herein. Some embodiments of method 340 may be facilitated by a beamforming manager, such as beamforming manager 210 as discussed herein in reference to FIG. 2.

At block 341, communication parameters for first set of user devices are received. In some embodiments, the first set of user devices comprise at least one user device. In some embodiments, the communication parameters may be received by beamforming manager 210 through telecommunications networks, such as telecommunications network 220.

At block 342, experience threshold rules associated with communication parameters are received. Some embodiments of block 342 may be facilitated by beamforming manager 210 as discussed herein in reference to FIG. 2. In some embodiments of block 342, experience thresholds may be associated with an individual communication parameter. For example CQI may have a first experience threshold, SINR may have a second experience threshold, channel load may have a third experience threshold, and sector load may have a fourth experience threshold, and so on. In some embodiments, the individual experience thresholds may be a predetermined value for each communication parameter. In some embodiments, the experience threshold may be associated with multiple communication parameters. For example, and experience threshold may be a CQI of a first value with a SINR of a second value. For another example, and experience threshold may be a SINR of a first value, a channel load of a second value, and an interband balance of a third value. It will be understood by those skilled in the art that the use experience thresholds are merely examples of possible multi-variant experience thresholds contemplated within the scope of the present invention. In some embodiments, at least one experience threshold rule may be received from a communicatively coupled data base (not depicted), storage media (not depicted), and/or server (not depicted). In an embodiment, the communicatively coupled data base, storage media, and/or server may be remotely connected to network 220 or directly connected to beamforming manager 210. Although method 340 depicts block 342 as an independent block, it will be understood by those in the art that, in various embodiments, block 342 may be incorporated with block 341, block 343, block 344, or may incorporated with blocks not depicted in method 320.

At block 343, communication parameters are analyzed. Some embodiments of block 343 may be facilitated by a beamforming manager, and/or a beamforming manager's sub-components, such as beamforming manager 210 and/or determining component 214. In general, communication data, such as communication parameters, is analyzed to determine whether the communication data indicates sub-optimal communication between the network and at least one user device. At block 344, determine if the experience threshold is violated. Some embodiments of block 344 maybe facilitated by a beamforming manager, and/or a beamforming manager's sub-components, such as beamforming manager 210 and/or determining component 214. In some embodiments, sub-optimal communication between the network and at least one user device may be detected where the communication parameters received in block 341 violates at least one experience threshold received in block 342. If no experience threshold(s) are violated method 340 returns to block 341. If at least one experience threshold is violated method 340 continues to block 345.

At block 345, beamforming weights are determined. Some embodiments of block 345 maybe facilitated by a beamforming manager, and/or a beamforming manager's sub-components, such as beamforming manager 210 and/or weighting component 216. In an embodiment, upon determining that at least one experience threshold is violated a determining component, such as determining component 214, may activate a weighting component such as weighting component 216 as discussed herein in reference to FIG. 2. In an embodiment, beamforming weights may be based on UE (i.e. user device) data and current antenna, antenna array, telecommunication tower, and/or base station settings. In some embodiments, generating the beamforming weights may further comprise comparing the current antenna settings to a predetermined list of beamforming weights with known and or predicted effects for the broadcasted signal. Additionally and/or alternatively, generating the beamforming weights may further comprise comparing the current antenna settings to beamforming weights determined by machine learned models. In some embodiments, the generated beamforming weights comprise at least one different value from the current antenna settings. For example, the generated beamforming weights may comprise a different power, amplitude, phase, and/or tilt while maintaining the current values for the three unmodified settings. In some embodiments, the generated beamforming weights may comprise one or more different values from the current antenna settings. For example, in some embodiments any combination of power, amplitude, phase, and/or tilt may be modified.

At block 346, at least one component of beamforming weights for an antenna, antenna array, telecommunication tower, and/or base station are modified. Some embodiments of block 346 may be facilitated by a beamforming manager, such as beamforming manager 210 as described herein in reference to FIG. 2. Generally, at block 346 generated beamforming weights are applied to antenna, antenna array, telecommunication tower, and/or base station such that the area covered by at least one sector, channel, and/or band are altered. In some embodiments, applying the generated beamforming weights to the antenna may increase the SINR, CQI, available bandwidth, and/or general signal strength and quality to at least one user device, such as user device 202*a*. In further embodiments, applying the generated beamforming weights to the antenna may alter the sector, band, channel, antenna, antenna array, and/or telecommunication tower communication band used to communicate with the one or more user devices. Once the generated beamforming weights are applied, method 340 may continue to block 347.

At block 347, it is determined whether the first set of user devices is communicating with the antenna, antenna array, telecommunication tower, and/or base station. Some embodiments of block 347 may be facilitated by a beamforming manager, such as beamforming manager 210. If at least one of the devices associated with the first set of user devices is still connected, some embodiments of method 340 proceeds to block 348. At block 348, communication parameters for at least one user device associated with the first set of user devices still connected to the antenna, antenna array, telecommunication tower, and/or base station are received. In some embodiments, the first set of user devices comprise at least one user device.

Returning briefly to block 347, if none of the first set of user devices is still connected to the telecommunication tower, method 340 may proceed to block 349. At block 349, beamforming weights for the antenna are modified to a default weight. In some embodiments, the default weight may be a predetermined set of beamforming weights. In other embodiments, the default weight may comprise determining beamforming weights configured to optimize communications with user devices not associated with the first set of user devices.

Figure 4A:
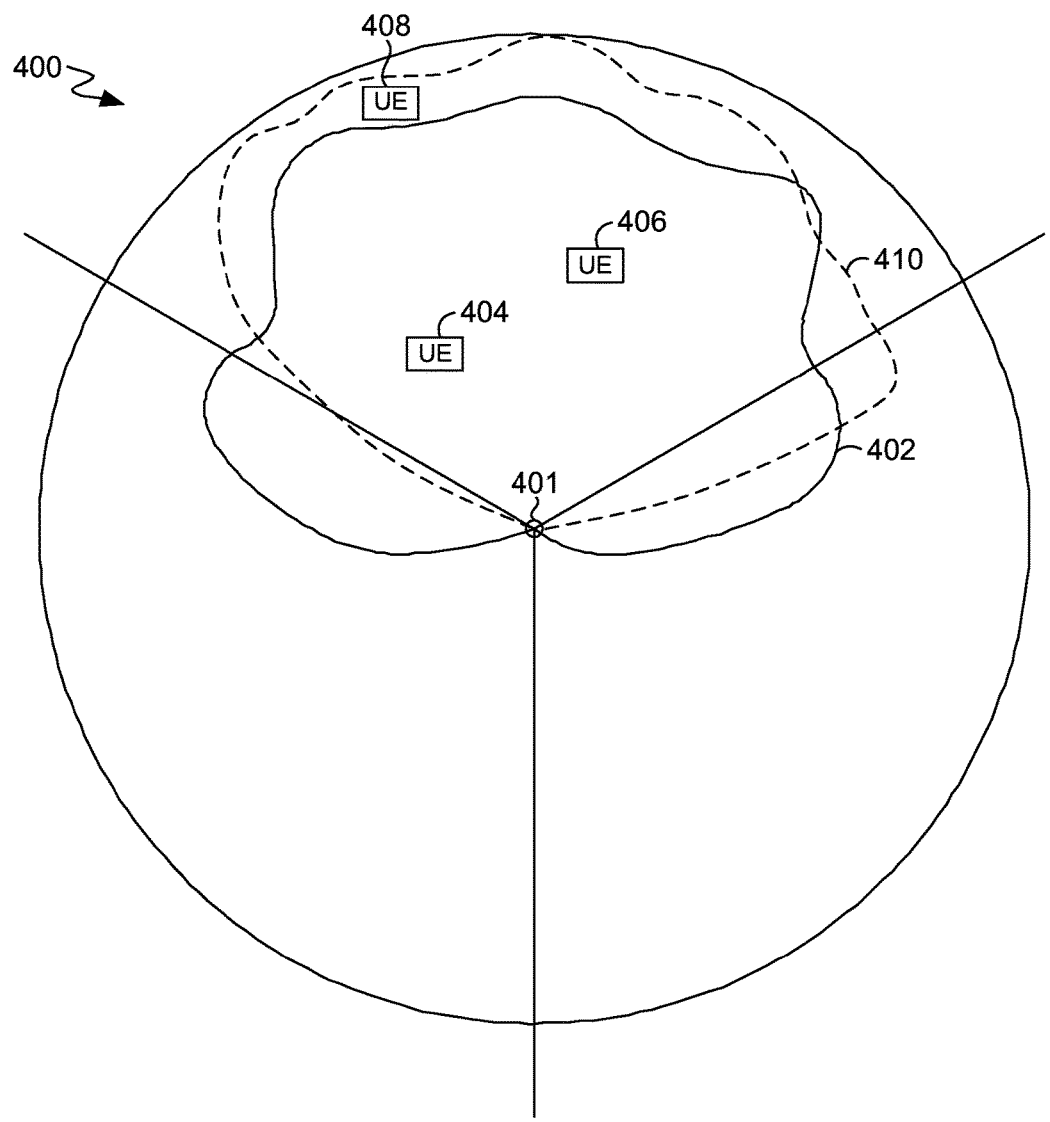
FIG. 4A depicts an exemplary application of dynamic beamforming, according to aspects herein.

Turning to FIG. 4A, an exemplary depiction 400 of dynamic beamforming is provided from an overhead perspective consistent with embodiments described herein. Generally, depiction 400 illustrates a first signal footprint 402 and a second signal footprint 410. The first signal footprint 402 represents the telecommunication coverage for a telecommunication antenna in a default broadcast mode using a first set of beamforming weights. The second signal footprint 410 represents the telecommunication coverage for the telecommunication antenna after the generated beamforming weights are applied to the antenna.

UE 404 represents at least one user device, such as user device 202a or 202b through 202n, within the first signal footprint 402. UE 406 represents at least one user device, such as user device 202a or 202b through 202n at a different location than UE 404 but also within the first signal footprint 402. As such, UE 404 and UE 406 may communicate with the telecommunications tower 401 with acceptable SINR and CQI.

UE 408 represents at least one user device, such as user device 202a or 202b through 202n, at yet another location. However, UE 408 is located just outside of the first signal footprint 402. In some embodiments, UE 408 may nonetheless be able to communicate with the communication tower 401 but with an unacceptable SINR and/or CQI. Further, in some embodiments, UE 408 may communicate with a communication tower not depicted in FIG. 4A.

As such, FIG. 4A depicts an exemplary application of embodiments described herein. For example, UE 404 and UE 406 may establish communication with the telecommunications network by way of a communication tower (e.g., through the antenna). Upon establishing communication, a beamforming manager, such as beamforming manager 210, may begin monitoring communication parameters associated with the communication of UE 404 and/or UE 406. For example, the beamforming manager may start monitoring and analyzing at least one of CQI, SINR, location, channel load, sector load, band capacity, F/B ratio, and USLS data received from the user devices and/or the telecommunications network. Beamforming manager may then determine that the communication parameters monitored and analyzed are within acceptable limits. In some embodiments, this may be accomplished by comparing the monitored communication parameters with at least one experience threshold.

UE 408 may establish communication and/or attempt to establish communication with the telecommunication network in the same way as described above. Upon establishing communication or attempting to establish communications, the beamforming manager may begin monitoring communication parameters associated with UE 408. Beamforming manager may then determine that the communication parameters monitored and analyzed are not within acceptable limits. For example the beamforming manager may determine that at least one of CQI, SINR, channel load, and/or band capacity violates at least one experience threshold. The beamforming manager may then generate new beamforming weights based on, at least, the location of UE 408 and the F/B ratio and/or the USLS of the antenna. Further, in some embodiments, the beamforming manager may also detect the current settings associated with the antenna. For example, the beamforming manager may detect the transmission mode, frequency, and/or band used by the antenna. This may be facilitated by a beamforming manager, such as beamforming manager 210 as discussed herein in relation to FIG. 2.

Upon generating the new beamforming weights, the beamforming manager may apply the beamforming weights to the antenna. In some embodiments, this may be facilitated by the beamforming manager transmitting the beamforming weights to an element management system (not depicted), a radio (not depicted), a base station (not depicted), a remote electric tilt controller, and/or any other computer, server, module, program suitable to control beamforming weights for the associated antenna. Once the beamforming weights are applied, the antenna transmits according to the second signal footprint 410. Further, in some embodiments, the beamforming manager continues to monitor communication parameters associated with UE 408, and may do so until such time that UE 408 no longer communicates with the antenna. In such an embodiment, the beamforming manager may continue to generate and apply new beamforming weights to the antenna(s) communicating with UE 408 when the communication parameters are determined to be outside acceptable limits.

It will be understood by those skilled in the art that UE 404, UE 406, and UE 408 may be individual user devices or a plurality of user devices; as such, UE 404, UE 406, and UE 408 are merely illustrative and not intended to limit the scope of the present disclosure or indicate that their presence is required for the functioning of embodiments disclosed herein. It will be further understood that the locations depicted in FIG. 4A are also merely illustrative and are not intended to limit the scope of the present disclosure.

Figure 4B:
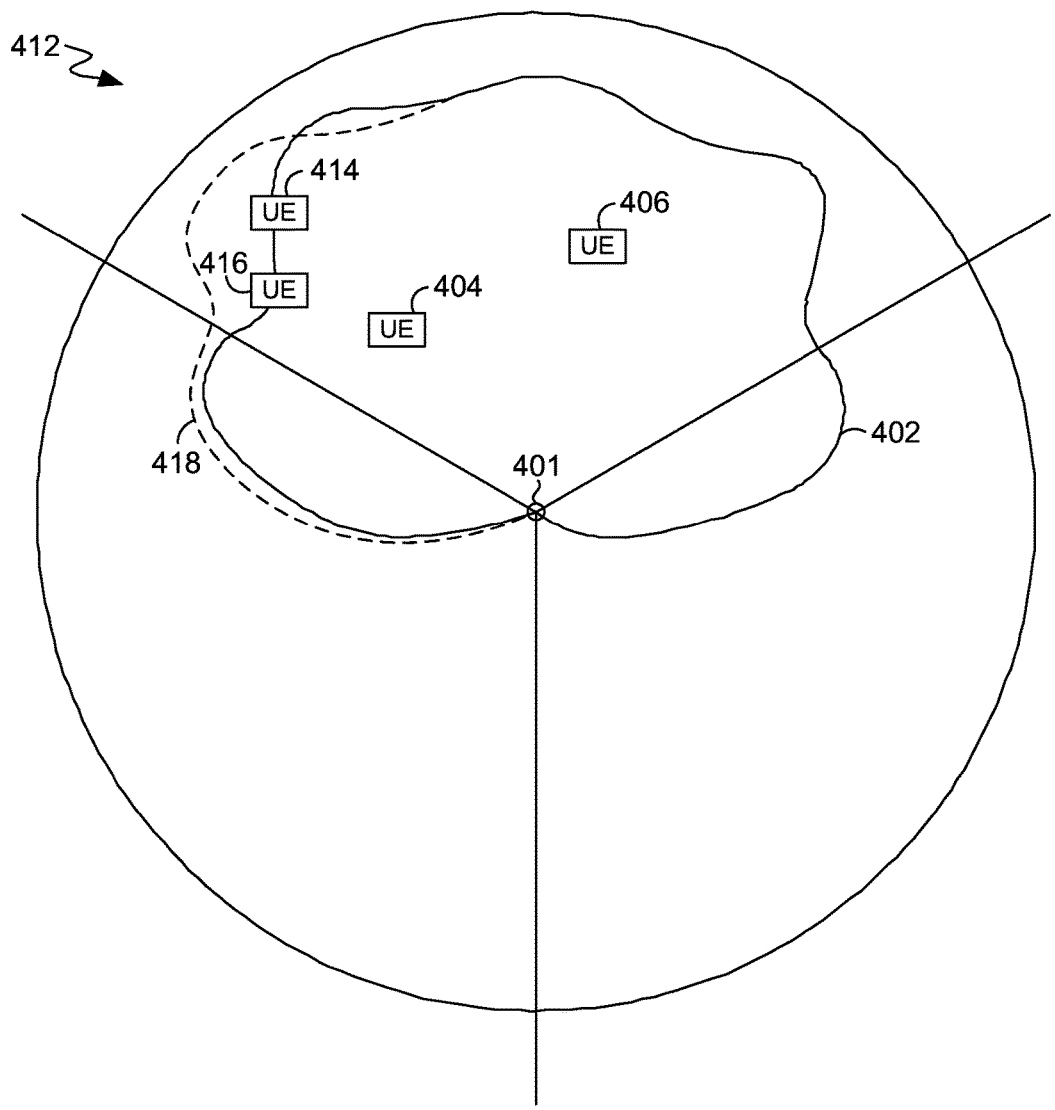
FIG. 4B depicts another exemplary application of dynamic beamforming, according to aspects herein.

Turning now to FIG. 4B, another exemplary depiction 412 illustrating dynamic beamforming is provided from an overhead perspective consistent with embodiments described herein. Similar to FIG. 4A, FIG. 4B generally depicts a first signal footprint 402 and a second signal footprint 418. The first signal footprint 402 represents the telecommunication coverage for telecommunication antenna and/or telecommunication antenna array at a first point in time. This first point in time may represent a default broadcast mode using a first set of beamforming weights. The second signal footprint 418 represents the telecommunication coverage for a telecommunication antenna or antenna array after generated beamforming weights are applied to the antenna or antenna array.

UE 404 represents at least one user device, such as user device 202a or 202b through 202n, within the first signal footprint 402. UE 406 represents at least one user device, such as user device 202a or 202b through 202n at a different location than UE 404 but also within the first signal footprint 402. As such, UE 404 and UE 406 may communicate with the telecommunications tower by way of an antenna with acceptable SINR and CQI.

UE 414 and UE 416 represent at least one user device, such as user device 202a or 202b through 202n at different locations than UE 404 or UE 406. However, UE 414 and UE 416 may be located outside of or along the edge of the first signal footprint 402. UE 414 and UE 416 may nonetheless be able to communicate with the communications antenna and/or communication tower 401. Further, in some embodiments UE 414 and/or UE 416 may communicate with the communications antenna and/or communication tower not depicted in FIG. 4B.

As such, FIG. 4B depicts another exemplary application of embodiments described herein. For example, UE 404 and UE 406 may establish communication with the telecommunications network through the antenna. Upon establishing communication, a beamforming manager, such as beamforming manager 210, may begin monitoring communication parameters associated with the communication of UE 404 and/or UE 406. For example, the beamforming manager may start monitoring and analyzing at least one of CQI, SINR, location, channel load, sector load, band capacity, F/B ratio, and USLS data received from the user devices and/or the telecommunications network. Beamforming manager may then determine that the communication parameters monitored and analyzed are within acceptable limits. This may be accomplished by comparing the monitored communication parameters with at least one experience threshold.

UE 414 and/or UE 416 may establish communications and/or attempt to establish communications with the telecommunication network through the communication tower 401. Upon establishing communications or attempting to establish communications, the beamforming manager may begin monitoring communication parameters associated with UE 414 and/or UE 416. Beamforming manager may then determine that the communication parameters monitored and analyzed are not within acceptable limits. For example, the beamforming manager may determine that at least one of CQI, SINR, channel load, and/or band capacity violates at least one experience threshold. The beamforming manager may then generate new beamforming weights based on, at least, the location of UE 414 and/or UE 416 and the F/B ratio and/or the USLS of the antenna and/or antenna array. Further, the beamforming manager may also detect the current settings associated with the antenna, antenna array, and/or the communications tower. For example, the beamforming manager may detect the transmission mode, frequency, and/or band used by the antenna, antenna array, and/or the communications tower. This may be facilitated by a beamforming manager, such as beamforming manager 210 as discussed herein in relation to FIG. 2.

Upon generating the new beamforming weights, the beamforming manager may apply the beamforming weights to the antenna, antenna array, and/or communications tower. In some embodiments, this may be facilitated by the beamforming manager transmitting the beamforming weights to an element management system, a radio, a base station, a remote electric tilt controller, and/or any other computer, server, module, or program configured to control beamforming weights for the associated antenna, antenna array, and/or communications tower. Once the beamforming weights are applied to the antenna, antenna array, and/or communications tower the transmission may resemble the second signal footprint 418. Further, in some embodiments, the beamforming manager continues to monitor communication parameters associated with UE 414 and/or UE 416. In such an embodiment, the beamforming manager may continue to generate and apply new beamforming weights to the antenna, antenna array, and/or the communication tower communicating with UE 414 and/or UE 416 when the communication parameters are determined to be outside acceptable limits.

In some embodiments, the beamforming manager may continue to monitor the communication parameters associated with UE 404 and/or UE 406. As such, the beamforming manager may continuously monitor and analyze communication parameters associated with a plurality of users within the second signal footprint 418. Beamforming manager may continue to generate and apply new beamforming weights to the antenna, antenna array, and/or the communication tower communicating with UE 404, UE 406, UE 414, and/or UE 416 when the communication parameters associated with the individual UE's and/or associated with a plurality of the UE's are determined to be outside acceptable limits. Thus, embodiments the present disclosure may continuously and dynamically adjust the signal footprint of an antenna, antenna array, and/or a communication tower, by generating and applying beamforming weights, such that at least some indicators of user experience (i.e. communication parameters) are, at least partially, optimized for at least one user.

Figure 4C:
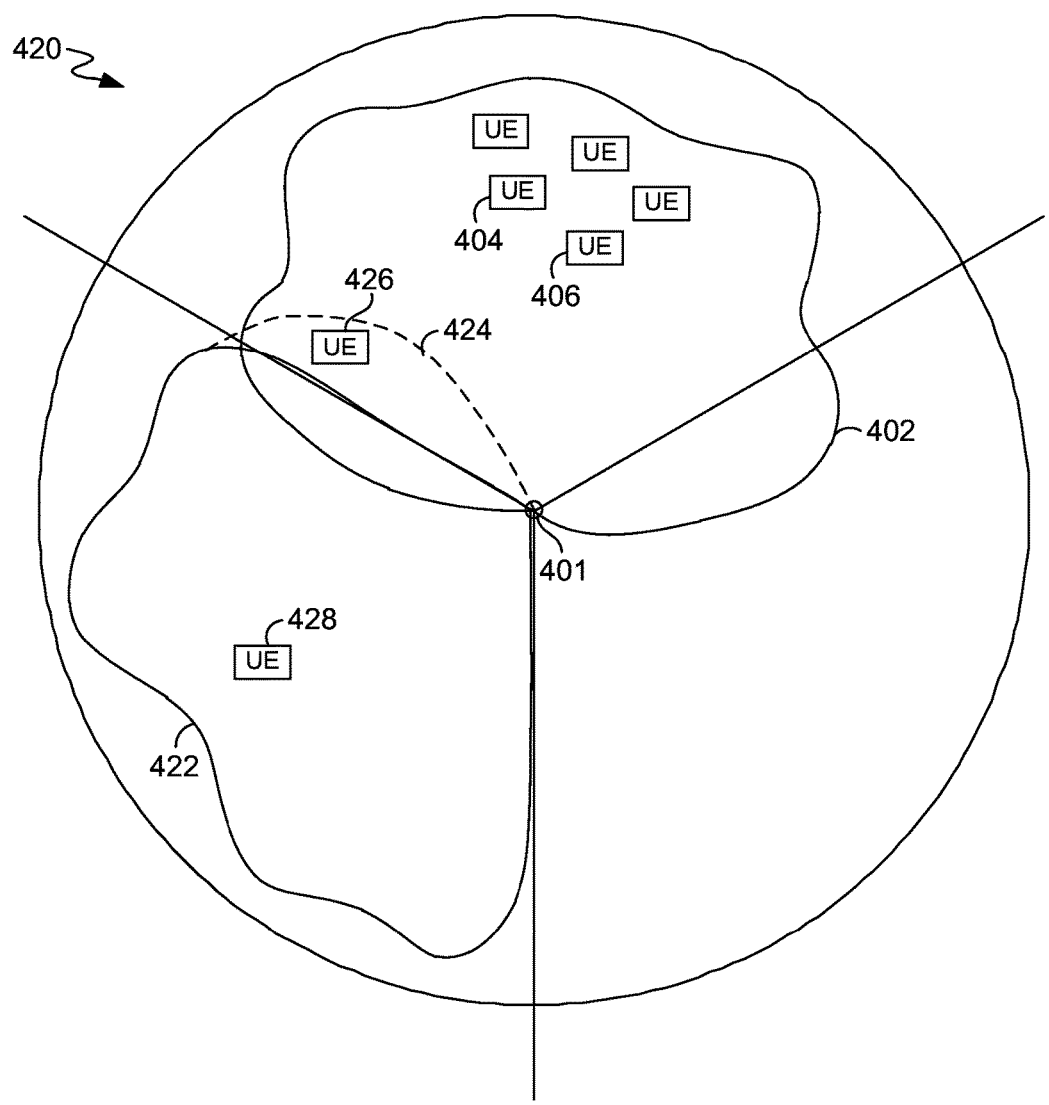
FIG. 4C depicts another exemplary application of dynamic beamforming, according to aspects herein.

Turning to FIG. 4C, an exemplary depiction 420 illustrating multi-sector dynamic beamforming is provided from an overhead perspective consistent with embodiments of the disclosure. UE 404 and UE 406 may establish communication with the telecommunication tower and/or base station through an antenna and/or antenna array associated with a first sector having a first signal footprint 402. UE 428 may establish communication with the telecommunication tower and/or base station through an antenna and/or antenna array associated with a second sector having a second signal footprint 422. Upon establishing communication, a beamforming manager, such as beamforming manager 210, may begin monitoring communication parameters associated with the communication of UE 404 and/or UE 406 and/or UE 428. For example, the beamforming manager may start monitoring and analyzing at least one of CQI, SINR, location, channel load, sector load, band capacity, F/B ratio, and USLS data received from the user devices and/or the telecommunications network. Beamforming manager may then determine that the communication parameters monitored and analyzed are within acceptable limits. In some embodiments this may be accomplished by comparing the monitored communication parameters with at least one experience threshold.

UE 426 may establish communication and/or attempt to establish communication with the telecommunication network through the antenna. Upon establishing communication or attempting to establish communication, the beamforming manager may begin monitoring communication parameters associated with UE 426. Beamforming manager may then determine that the communication parameters monitored and analyzed are not within acceptable limits. In some embodiments, the beamforming manager may determine that at least one of CQI, SINR, sector load, channel load, and/or band load violates at least one experience threshold. For example, the beamforming manager may detect that the sector load for the first sector violates at least one experience threshold associated with the sector load communication parameter. The beamforming manger may detect that an adjacent sector has excess capacity. For example, the beamforming manager may detect the sector load, channel load, and/or band load associated with the antenna and/or antenna array communicating with UE 428 is within acceptable limits. This may be facilitated, in part, by a determining component, such as determining component 214.

The beamforming manager may then generate new beamforming weights based on, at least, the location of UE 426 and the F/B ratio and/or the USLS of at least one antenna and/or antenna array. Further, in some embodiments, the beamforming manager may also detect the current settings associated with at least one antenna and/or antenna array. For example, the beamforming manager may detect the transmission mode, frequency, and/or band used by the antenna and/or antenna array for the second sector (i.e., the second signal footprint 422).

Upon generating the new beamforming weights, the beamforming manager may apply the beamforming weights to at least one the antenna, antenna array, and/or communications tower. For example, the beamforming weights may be applied to the antenna and/or antenna array associated with the second sector. In some embodiments, this may be facilitated by the beamforming manager transmitting the beamforming weights to an element management system, a radio, a base station, a remote electric tilt controller, and/or any other computer, server, module, or program configured to control beamforming weights for the associated antenna, antenna array, and/or communications tower. Once the beamforming weights are applied to the antenna, antenna array, and/or communications tower the transmission may resemble the signal footprint 424. Further, in some embodiments the beamforming manager continues to monitor communication parameters associated with UE 404 and/or UE 406. In such an embodiment, the beamforming manager may continue to generate and apply new beamforming weights to the antenna, antenna array, and/or the communication tower communicating with UE 404, 406, 426 and/or UE 428 when the communication parameters are determined to be outside acceptable limits.

It will be understood by those skilled in the art that UE 404, UE 406, UE 426 and UE 428 may be individual user devices or a plurality of user devices; as such, UE 404, UE 406, UE 426 and UE 428 are merely illustrative and not intended to limit the scope of the present disclosure or indicate that their presence is required for the functioning of embodiments disclosed herein. It will be further understood that the locations depicted in FIG. 4C are also merely illustrative and are not intended to limit the scope of the present disclosure.

Figure 5:
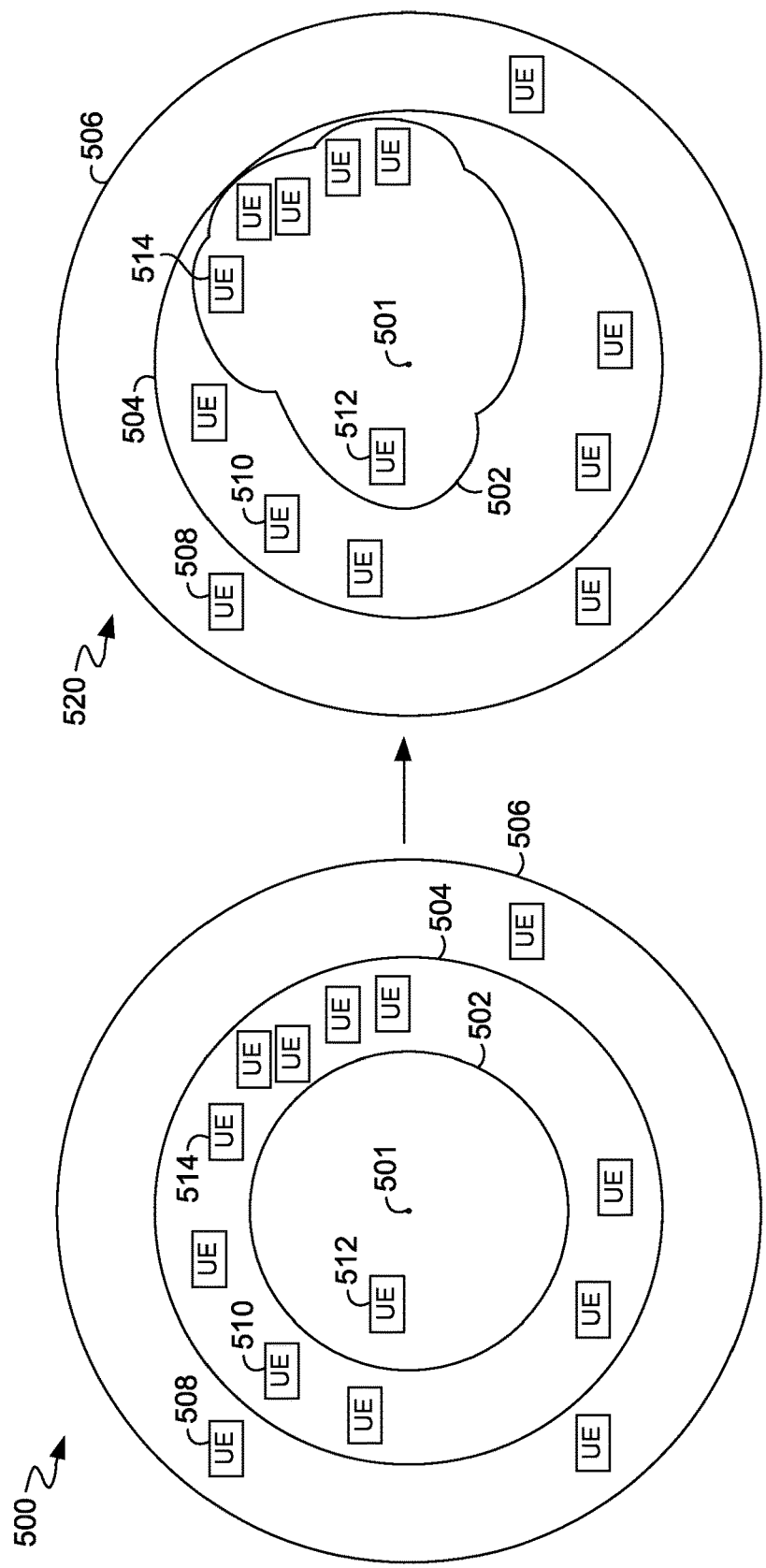
FIG. 5 depicts an exemplary application of multi-band dynamic beamforming, according to aspects herein.

Turning to FIG. 5, an exemplary depiction of multiband dynamic beamforming is provided from an overhead perspective consistent with embodiments described herein. FIG. 5 depicts a telecommunication tower 501 at an initial time point 500 prior to engaging dynamic beamforming, such as prior to initializing dynamic beamforming through the exemplary methods provided herein. FIG. 5 further depicts the telecommunication tower 501 at a subsequent time 520 after dynamic beamforming has begun, such as after initializing dynamic beamforming through the exemplary methods provided herein.

Beginning with the initial point in time 500, the telecommunication tower 501 broadcasting a multiband signal is depicted. A first band may have a first signal footprint 502, a second band may have a second signal footprint 504, and a third band may have a third signal footprint 506. In some embodiments, the first band, second band, and/or third band may be capable of beamforming. Further, in an embodiment, each of the bands may be broadcasted from the same antenna and/or antenna array associated with telecommunication tower 501. In an embodiment, each of the bands may be broadcasted by a dedicated antenna and/or antenna array. UE 508, UE 510, UE 512, and UE 514 each represent at least one user device, such as user device 202a or 202b through 202n.

In some embodiments, UE 512 may communicate with telecommunication tower 501 using the first band. In an embodiment, the first band may be any telecommunication band with an established frequency range, for example band 41 (2500 MHz). In some embodiments, UE 510 and/or UE 514 may communicate with telecommunication tower 501 using the second band. In an embodiment, the second band may be any telecommunication band other than the first band, for example band 25 (1900 MHz). In some embodiments, UE 508 may communicate with telecommunication tower 501 by using the third band. In an embodiment, the third band may be any telecommunication band other than the first and second, for example band 26 (850 MHz). It will be understood by those skilled in the art that the above referenced bands represent merely an example of possible band combinations within the scope of the present disclosure. As such, it will be understood by those skilled in the art that the scope of the present disclosure includes any combination of bands that includes at least one band capable of beamforming. For example, bands 12-17 (700 MHz), band 29 (700 MHz), and band 30 (2300 MHz) are just a few bands that are contemplated herein.

A beamforming manager, such as beamforming manager 210, may monitor the communication parameters associated with the plurality of UEs communicating with telecommunications tower 501. For example, the beamforming manager may start monitoring and analyzing at least one of CQI, SINR, location, channel load, sector load, band capacity, F/B ratio, and USLS data received from the UEs and/or the telecommunications network. The beamforming manager may then determine the communication parameters monitored and analyzed are not within acceptable limits. For example the beamforming manager may determine that at least one of CQI, SINR, channel load, and/or band capacity violates at least one experience threshold. The beamforming manager may then generate new beamforming weights based on, at least, the location of UE 408 and the F/B ratio and/or the USLS of the antenna.

Once the beamforming manager generates the new beamforming weights, the beamforming weights may be applied to the antenna, antenna array, and/or telecommunication tower. In some embodiments, this may be facilitated by the beamforming manager transmitting the beamforming weights to an element management system, a radio, a base station, a remote electric tilt controller, and/or any other computer, server, module, or program configured to control beamforming weights for the associated antenna, antenna array, telecommunications tower, and/or telecommunication network. In some embodiments, the generated beamforming weights may modify at least one of the phase, amplitude, power, and/or tilt of at least one antenna and/or antenna array associated with the telecommunication tower 501. In an embodiment, modifying the phase, amplitude, and/or power of the antenna array may be accomplished by applying at least one component of the generated beamforming weights to at least one of the individual antennas that make up the antenna array. In an embodiment, modifying the tilt of the antenna array may be accomplished by applying at least one component of the generated beamforming weights to the antenna array such that the angular position of the antenna array is changed from a first position (initial position) to a second position. For example, this may be facilitated by a remote electronic tilt controller.

Moving to the subsequent time point 520, the telecommunication tower 501 broadcasting a multi-band signal is depicted, wherein one of the bands has been dynamically beamformed consistent with embodiments described herein. As depicted, the first band may have a beamformed signal footprint 502, the second band may have the second signal footprint 504, and the third band may have a third signal footprint 506. However, it will be understood by those skilled in the art that FIG. 5's depiction is illustrative and as such, is not intended to suggest that any particular band must be dynamically beamformed. Rather, any band capable of beamforming may be beamformed within the scope of the present invention.

After the application of the generated beamforming weights to at least one antenna and/or antenna array, UE 512 may communicate with telecommunication tower 501 using the first band. Further, UE 514 may begin communicating with telecommunication tower 501 using the first band. The change from the UE 514 communicating with telecommunication tower 501 through the second band, as depicted at the initial time point 500, to UE 514 communicating with telecommunication tower 501 through the first band, as depicted at the subsequent time point 520, may be facilitated by any handoff method. Thus by performing the methods, using the system, and/or using the devices described herein dynamic beamforming may be utilized to facilitate balancing user devices across multiple bands by monitoring and acting upon indicators of communication quality, such as communication parameters.

Figure 6:
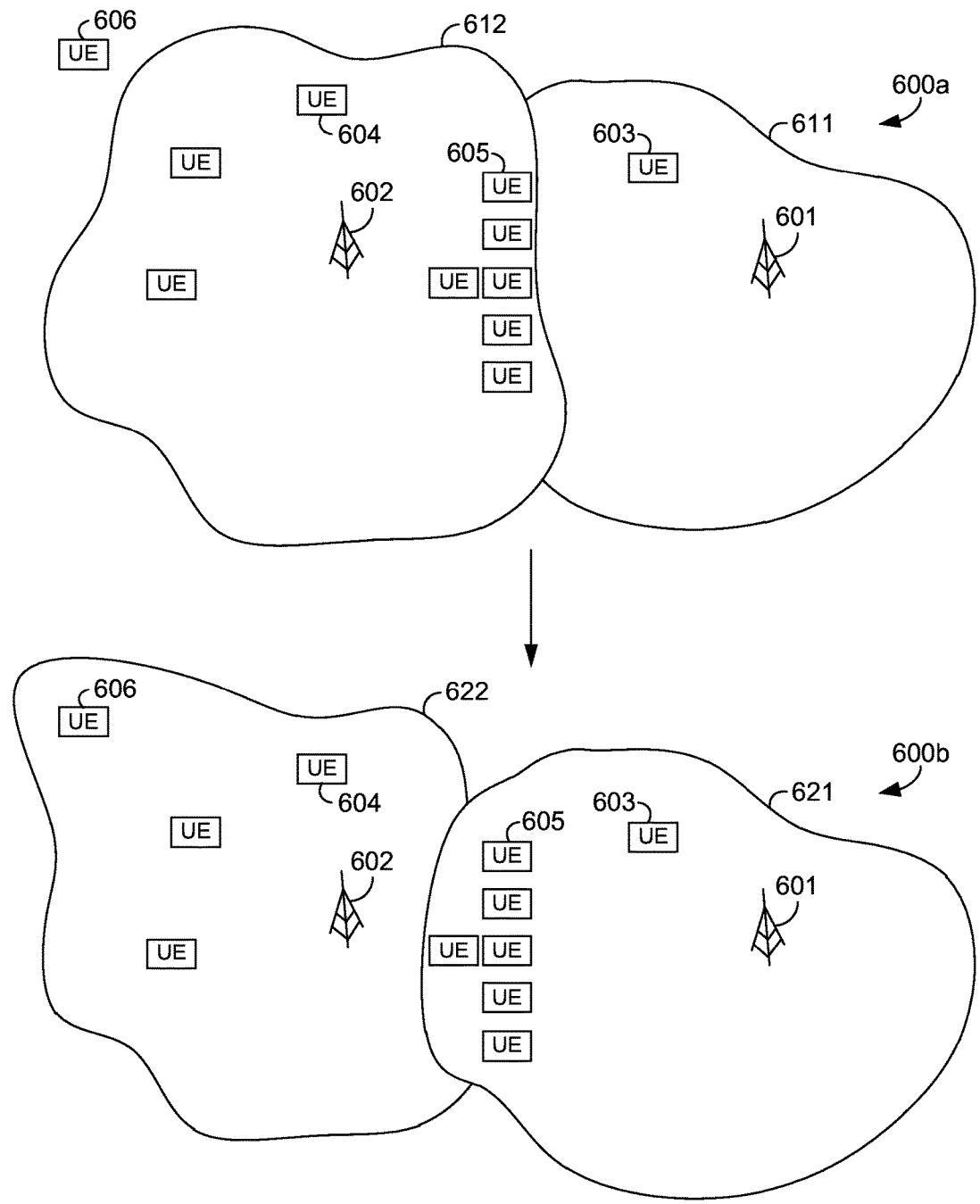
FIG. 6 depicts an exemplary application of multi-tower dynamic beamforming, according to aspects herein.

Turning now to FIG. 6, an exemplary embodiment of multi-tower dynamic beamforming consistent with embodiments of the present invention is depicted. Generally, FIG. 6 depicts multi-tower dynamic beamforming that may be facilitated by a beamforming manger and/or a method consistent with the present invention, such as beamforming manger 210 and/or method 300. As depicted, UEs 603, 604, 605, and 606 represent at least one user device, such as user device 202a.

Beginning at an initial time point 600a, telecommunication tower 601 may broadcast a signal with a signal footprint 611 and telecommunication tower 602 may broadcast a signal with a signal footprint 612. A beamforming manager may receive information from telecommunication towers 601 and 602. In some embodiments, the information received by the beamforming manger may comprise communication parameters associated with UEs 603-606. The beamforming manager may also receive information related to the transmission mode and/or band(s) telecommunication towers may broadcast. For example, the beamforming manager may detect that telecommunication tower 602 may broadcast in transmission mode 3, transmission mode 8, and/or transmission mode 9. As another example, the beamforming manager may detect that telecommunication tower 601 may broadcast in transmission mode 3, transmission mode 8, and/or transmission mode 9. The beamforming manager may generate beamforming weights based on the transmission mode associated with at least one antenna, antenna array, telecommunications tower, base station, and/or telecommunication network.

The beamforming manager may analyze the communication parameters associated with each of the UEs 603-606, individually and/or in aggregate. For example, the beamforming manager may determine that the CQI and/or SINR for UE 603's communication with tower 601 indicates a high quality connection. Further, the beamforming manager may determine that the channel load, sector load, and/or band load for tower 601 is acceptable. The beamforming manager may determine that the CQI and/or SINR for UEs 605 and 604 indicates a high quality connection with tower 602. In some embodiments, this analysis may be facilitated by the beamforming manager or a subcomponent of the beamforming manager, such as determining component 214.

However, the beamforming manager may determine that the channel load, sector load, and/or band load for tower 602 is unacceptable and dynamic beamforming is appropriate. For example, the channel load, sector load, and/or band load may violate one or more experience thresholds associated with the communication parameters. Additionally, and/or alternatively, the beamforming manager may determine that the CQI and/or SINR for UE 606 is unacceptable and dynamic beamforming is appropriate. For example, the CQI and/or SINR may violate one or more experience thresholds associated with the communication parameters. In some embodiments, upon the beamforming manager determining that at least one communication parameter indicates that dynamic beamforming is appropriate, the beamforming manager may generate beamforming weights.

Once the beamforming manager generates the new beamforming weights, the beamforming weights may be applied to at least one antenna, antenna array, and/or telecommunication tower. The generated beamforming weights may modify at least one of the phase, amplitude, power, and/or tilt of at least one antenna and/or antenna array associated with at least one telecommunication tower, such as telecommunication tower 601 and/or telecommunication tower 602. This may be facilitated by the beamforming manager transmitting the beamforming weights to at least one element management system, radio, base station, remote electric tilt controller, and/or any other computer, server, module, or program configured to control beamforming weights for the associated at least one antenna, antenna array, telecommunications tower, base station, and/or telecommunication network.

Moving to the subsequent time point 600b, the telecommunication towers are depicted after application of generated beamforming weights to at least one of the telecommunication towers. As depicted, the beamformed broadcast signal associated with telecommunication tower 602 may have a signal footprint 622. The broadcast signal associated with the telecommunication tower 601 may have a signal footprint 621. However, it will be understood by those skilled in the art that FIG. 6's depiction is illustrative, and as such, is not intended to suggest that any particular antenna, antenna array, telecommunication tower, and/or base station must be dynamically beamformed. Rather, any antenna, antenna array, telecommunication tower, and/or base station capable of beamforming may be beamformed within the scope of the present invention.

After the application of the generated beamforming weights to at least one antenna and/or antenna array associated with at least one of the telecommunication towers, at least one signal may have been altered. After applying the generated beamforming weights, user device may begin communicating with a different telecommunication tower. For example, UE 605 may switch from communicating with telecommunication tower 602 to telecommunication tower 601. This may be facilitated by any handoff method. In some embodiments, after applying the generated beamforming weights, a user device may have improved connection quality, as measured by for example communication parameters, with the same tower. For example, UE 606 may have improved SINR and/or CQI as detected by the beamforming manager. For another example, UE 604 may have improved bandwidth, as determined by the beamforming manager's analysis of channel load, sector load, and/or band load. Thus by performing the methods, using the system, and/or using the devices described herein, dynamic beamforming may be utilized to facilitate balancing user devices across multiple telecommunication towers by monitoring and acting upon indicators of communication quality, such as communication parameters.

As an illustrative example, a user, Bob, may have a user device he wishes to connect to the telecommunications network. Bob may activate the device by, for example, turning the device on, activating a communication mode, or any other means of activation. Bob's user device may then connect with the telecommunication network via an antenna and/or antenna array mounted to a telecommunications tower and/or base station. Upon connecting, Bob's user device may begin to transmit information related to the quality of the connection (i.e. communication parameters) to the base station. A beamforming manager, such as beamforming manager 210, may receive the communication parameters associated with Bob's user device through a receiving component, such as receiving component 212, and monitor the communication parameters through a determining component, such as determining component 214.

Continuing with the example, the initial connection established by Bob's user device may be determined by the beamforming manager to be of sufficient quality that dynamic beamforming is not appropriate. For example, Bob's user device may transmit CQI and/or SINR values that the beamforming manager determines indicates a high quality connection between the base station and Bob's user device. Further, in an embodiment, the beamforming manager may determine that the channel load, sector load, and/or band load indicate that Bob's user device has sufficient bandwidth to communicate with the base station at, at least partially, optimal conditions.

At some subsequent point in time, the beamforming manager may detect that the connection to Bob's user device is no longer acceptable and, as such, dynamic beamforming is appropriate. For example, Bob's user device may have traveled to a different location beyond or nearly beyond the current coverage range of the telecommunication tower. In another example, Bob's user device may be within the coverage area but experiencing interference, such as from other user devices, physical obstructions, and/or destructive electromagnetic interference, and the like. As such, the beamforming manger may detect that the CQI and/or SINR values associated with Bob's user device may have fallen below the experience threshold associated with the CQI and/or SINR parameters.

Additionally, and/or alternatively, more user devices may be connected to and/or may be consuming more bandwidth from the antenna, antenna array, telecommunication tower, and/or base station. For example, Bob's user device may be at a Kansas City Royals baseball game at Kaufmann Stadium and a plurality of other user devices may be at the stadium and the surrounding area. As such, the beamforming manager may determine that the channel load, sector load, and/or band load associated with the channel, sector, and/or band utilized by the user devices, including Bob's device, may have risen above the experience threshold associated with the channel load, sector load, and/or band load.

In some embodiments, the beamforming manager may then begin to generate beamforming weights by, for example, activating a weighting component, such as weighting component 216. In some embodiments, the beamforming manager may detect the current transmission mode and/or beamforming weights currently used by the antenna. In an embodiment, the current beamforming weights may comprise a weight value for at least one of the phase, amplitude, power, and tilt associated with the antenna utilized by the user device(s). Further, in some embodiments the beamforming manager may detect the F/B ratio and/or USLS associated with the antenna and/or antenna array utilized by the user device(s).

At least partially based on the detected information and the location of the user device(s), the beamforming manager may generate beamforming weights as discussed in relation to weighting component 216. Once generated, the beamforming weights may be applied to the antenna, antenna array, telecommunications tower, and/or the base station. As discussed throughout this disclosure, in some embodiments application of the generate beamforming weights may be facilitated by transmission of the beamforming weights to an element management system, a remote electric tilt controller, a radio, the base station, or any other program, module, computer that is configured to interface with the like. In other embodiments, the beamforming manager may directly apply the generated beamforming weights to the antenna, antenna array, telecommunications tower, and/or base station.

Returning to the illustrative example, once applied to the antenna, antenna array, telecommunication tower, and/or base station the generated beamforming weights may, at least partially, alter the effective coverage area (i.e. signal footprint), signal strength, channel load, sector load, and/or band load for at least one user device. For example, as discussed in relation to FIG. 4A and FIG. 4B, the application of the generated beamforming weights may result in Bob's user device communicating with the same telecommunications tower as it was before the beamforming weights were applied. But, at least one of the phase, amplitude, power, and/or tilt of the antenna may have been altered. As such, the signal from the antenna may have been "steered" toward Bob's user device, at least partially, improving the connection quality as determined by the beamforming mangers analysis of the communication parameters associated with Bob's user device.

For another example, as discussed in relation to FIG. 4C, the application of the generated beamforming weights may result in Bob's user device communicating with the same telecommunications tower and/or base station as it was before the beamforming weights were applied, although the antenna and/or antenna array have been altered. As such, Bob's user device was handed-off to the antenna and/or antenna array responsible for a different sector by steering at least a portion of the different sector's signal toward Bob's user device by the application of the generated beamforming weights.

In yet another example, as discussed in relation to FIG. 5, the application of the generated beamforming weights may result in Bob's user device communicating with the same telecommunications tower as it was before the beamforming weights were applied. However, the band utilized for communicating may have changed. As such, application of the beamforming weights steered the coverage area of a band, at least partially, toward Bob's user device and the communication between Bob's device and the telecommunications tower was handed off to a different band. Also, other user devices may be utilizing a different band for communicating with the telecommunications network. In both of these exemplary scenarios, embodiments described herein may be utilized to balance band load across multiple bands.

For yet another example, as discussed in relation to FIG. 6, the application of the generated beamforming weights may result in Bob's user device communicating with the same telecommunications tower as it was before the beamforming weights were applied. However, at least one of the phase, amplitude, power, and/or tilt of the antenna may have been altered. Further, other user devices may communicate with a different telecommunications tower. For illustrative purposes, in this example, Bob's user device may be UE 604 or UE 606 and the other user devices may be UE 605.

As a final example, as discussed in relation to FIG. 6, the application of the generated beamforming weights may result in the other user devices communicating with the same telecommunications tower as they were before the beamforming weights were applied, but with at least one of the phase, amplitude, power, and/or tilt of the antenna being altered. Bob's user device may communicate with a different telecommunications tower. For illustrative purposes, in this example Bob's user device may be UE 605 and the other user devices may be UE 604 and 606.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of dynamic beamforming based on detected parameters, the method comprising:
receiving, from a first user device, a first set of communication parameters associated with communication between a first antenna array associated with a base station and the first user device, wherein the first set of communication parameters comprises user device location data and at least one of channel quality index (CQI), channel load, band load, and signal-to-noise ratio (SINR);
receiving, from a second user device, a second set of communication parameters associated with communication between the first antenna array and the second user device;
analyzing the first set of communication parameters and the second set of communication parameters;
based on the analyzing, determining how to modify at least one component of a first set of beamforming weights to produce a second set of beamforming weights used to modify a beam emitted by a second antenna array associated with the base station;
dynamically applying the second set of beamforming weights to the second antenna array; and
in response to the dynamic application, transferring communication between the second device and the first antenna array to the second antenna array.

2. The method of claim 1, wherein the analyzing comprises:
determining at least one of the second set of communication parameters violates an experience threshold, wherein a violation is defined by at least one predetermined rule associated with at least one of the second set of communication parameters.

3. The method of claim 1 further comprising:
analyzing a third set of communications parameters between the first telecommunication tower and the first user device, wherein the third set of communications parameters occurs at least partially after the second set of beamforming weights is applied to the second antenna array;
based on the analyzing, determining a third set of beamforming weights;
dynamically modifying at least one component of beamforming weights for the first antenna array by applying the third set of beamforming weights to the first antenna array.

4. The method of claim 1, further comprising:
utilizing a first frequency band, establishing communication between the first antenna array, the first device, and the second user device; and
wherein the second antenna array utilizes a second frequency band, and wherein the second frequency band and the first frequency band are different frequency bands.

5. The method of claim 1, wherein the communications parameters further comprise at least one of sector loading, band capacity, band-to-band balance, front-to-back ratio, and upper side lobe suppression.

6. The method of claim 1 further comprising:
detecting that the second user device is no longer communicating with the second antenna array;
dynamically modifying at least one component of beamforming weights for the second antenna array by applying a default beamforming weight to the second antenna array.

7. The method of claim 1, wherein the at least one component of beamforming weights comprise a phase weight.

8. The method of claim 1, wherein the at least one component of beamforming weights comprise an amplitude weight.

9. The method of claim 1, wherein the at least one component of beamforming weights comprise a power weight.

10. The method of claim 1, wherein the at least one component of beamforming weights comprise a tilt weight.

11. One or more non-transitory computer-readable storage media having computer-executable instructions embodied thereon that, when executed, perform a method for dynamically adjusting beamforms, the method comprising:
utilizing a first frequency band, establishing communication between a first antenna array and a first set of user devices, wherein the first antenna array has a first coverage footprint;
utilizing the first frequency band, establishing communication between the first antenna array and a second set of user devices;
monitoring a first set of communication parameters between the first antenna array and the first set of user devices, wherein the communication parameters for the first set of user devices comprise user device location data and at least one of, channel quality index (CQI), channel load, band load, and signal-to-noise ratio (SINR);
based on the communication parameters, determining that beamforming is to be used;
generating beamforming weights for a second antenna array, based on the monitored communication parameters, wherein the first antenna array and the second antenna array are located in a cell;
applying the beamforming weights to the second antenna array; and
in response to applying the beamforming weights to the second antenna array, transferring communication between the first antenna array and the first set of user devices to the second antenna array.

12. The media of claim 11, wherein the determining beamforming is to be used comprises:
determining at least one of the first set of communication parameters violates an experience threshold, wherein a violation is defined by at least one predetermined rule associated with at least one of the first set of communication parameters.

13. The media of claim 11 further comprising:
analyzing a second set of communications parameters between the first antenna array and the first set of user devices, wherein the second set of communications parameters occurs at least partially after the beamforming weights are applied to the second antenna array;
based on the analyzing, determining alternate beamforming weights;
dynamically modifying the first antenna array by applying the alternate beamforming weights to the first antenna array.

14. The media of claim 11, wherein the beamforming weights are predetermined and at least partially based on a location of the first set of user devices.

15. The media of claim 11 further comprising:
monitoring a second set of communication parameters between the first antenna array and a second set of user devices;
analyzing the second set of communications parameters between the first antenna array and a second set of user devices;
based on the analyzing, determining a second set of beamforming weights;
dynamically modifying at least one component of beamforming weights for the first antenna array by applying the second set of beamforming weights to the first antenna array.

16. The media of claim 11, wherein the communications parameters comprise at least one of band capacity, band-to-band balance, front-to-back ratio, and upper side lobe suppression.

17. The media of claim 11 further comprising:
detecting that the first set of user devices is no longer communicating with the second antenna array;
dynamically modifying the beamforming weights for the second antenna array by applying a default beamforming weight to the second antenna array.

18. The media of claim 11, wherein the at least one component of beamforming weights comprise at least one of a phase weight, an amplitude weight, a tilt weight, and a power weight.

19. A system configured to dynamically adjust beamforms based on detected parameters, the system comprising:
at least a first base station, wherein the first base station is associated with a first antenna array and a second antenna array, and wherein the first base station is configured for communicating with a first set of user devices and a second set of user devices;
an element management component configured for:
receiving communication parameters associated with the communicating between the first base station and the first and second sets of user devices, wherein the communication parameters comprise user device location data and at least one of, channel quality index (CQI), channel load, band load, and signal-to-noise ratio (SINR);
analyzing the communications parameters for violations of at least one experience threshold, wherein a violation is defined by at least one predetermined rule associated with at least one of the communications parameters;
determining, based on the analyzing, a set of beamforming weights;
dynamically modifying at least one component of beamforming weights for the first antenna array by applying the set of beamforming weights to at least one antenna of the first antenna array, wherein in response to applying the set of beamforming weights the first base station transfers communications between the first antenna array and the first set of user devices to a second antenna array.

20. The system of claim 19, wherein the first antenna array utilizes a first frequency band and the second antenna array utilizes a second frequency band, the first frequency band being different from the second frequency band.

* * * * *